(12) United States Patent
Iijima et al.

(10) Patent No.: US 7,590,341 B2
(45) Date of Patent: Sep. 15, 2009

(54) CAMERA MODULE

(75) Inventors: Tomokuni Iijima, Osaka (JP); Satoshi Tamaki, Osaka (JP); Takashi Haruguchi, Fukuoka (JP); Masaki Tagome, Osaka (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 10/580,926

(22) PCT Filed: Apr. 13, 2005

(86) PCT No.: PCT/JP2005/007128

§ 371 (c)(1),
(2), (4) Date: May 30, 2006

(87) PCT Pub. No.: WO2005/101083

PCT Pub. Date: Oct. 27, 2005

(65) Prior Publication Data
US 2007/0110424 A1 May 17, 2007

(30) Foreign Application Priority Data
Apr. 13, 2004 (JP) ............................ 2004-118211

(51) Int. Cl.
*G03B 13/34* (2006.01)
*G02B 7/04* (2006.01)

(52) U.S. Cl. ...................... 396/133; 396/144

(58) Field of Classification Search ................. 396/72, 396/79, 133, 144; 348/345, 357; 355/67, 355/77; 369/44.15, 44.16
See application file for complete search history.

(56) References Cited

U.S. PATENT DOCUMENTS

| 4,302,830 | A | 11/1981 | Hamaoka et al. |
| 5,361,243 | A | 11/1994 | Kasahara |
| 2008/0158412 | A1* | 7/2008 | Tagome et al. ............ 348/374 |

FOREIGN PATENT DOCUMENTS

| JP | 54-135504 | 10/1979 |
| JP | 3265091 | 6/1995 |
| JP | 9-18771 | 1/1997 |
| JP | 2002-365514 | 12/2002 |
| JP | 2003-115127 | 4/2003 |

* cited by examiner

*Primary Examiner*—Rodney E Fuller
(74) *Attorney, Agent, or Firm*—Hamre, Schumann, Mueller & Larson

(57) ABSTRACT

A camera module including: a lens portion including at least one lens; an imaging element; a fixed portion; a first elastic body that is provided on a side opposite to the imaging element side with respect to the lens and couples the lens portion and the fixed portion; and a second elastic body that is provided on the imaging element side with respect to the lens and couples the lens portion and the fixed portion. The first elastic body and the second elastic body have the same shape. The first elastic body and the second elastic body are arranged so as to oppose each other while sharing a common central axis. The second elastic body is arranged so that so that the shape of the second elastic body is different from a shape of the first elastic body projected in the optical axis direction of the lens.

12 Claims, 16 Drawing Sheets

CAMERA MODULE

TECHNICAL FIELD

The present invention relates to a small and thin autofocus camera module with low power consumption.

BACKGROUND ART

An autofocus camera module disclosed in JP 9(1997)-18771 A is one example of a conventional camera module. FIG. 21 is a sectional view showing a configuration of this conventional camera module.

In FIG. 21, a voice coil motor 953 includes a drive coil 920, a bobbin 922, a center yoke 923, and a permanent magnet 924. A movable base 952 is connected to the bobbin 922. The center yoke 923 is provided in a yoke fixing portion 990a of a fixed base 990. A lens 981 is provided in an opening 990e of the fixed base 990, and a lens 982 is provided in an opening of the center yoke 923.

In this camera module 900, a shaft-mounting plate 991 is fixed so as to be parallel to the yoke fixing portion 990a. To this shaft-mounting plate 991, one end of each of two guide shafts 951a and 951b extending in the optical axis direction of the lens 981 is connected. The other end of each of the two guide shafts 951a And 951b is connected to the yoke fixing portion 990a. Fitting holes 952a and 952b are formed in the movable base 952. The guide shafts 951a and 951b are fitted in the fitting holes 952a and 952b, respectively. Thus, the movable base 952 is supported so as to be movable in the optical axis direction of the lens 981. An opening 952c is formed in a front portion (a portion on a side closer to the lens 981) of the movable base 952, and a CCD (Charge Coupled Device) 902 is fixed firmly to a rear portion (a portion on a side farther from the lenses 981 and 982) of the movable base 952. Optical filters 983, 984, and 985, such as an infrared cutoff filter, an optical LPF, and the like, are arranged on the front side (the side closer to the lens 981) of the CCD 902.

Next, the operation of the conventional camera module 900 shown in FIG. 21 will be described. Incident light enters the camera module 900 via the lenses 981 and 982, passes through the opening 952c to reach the CCD 902 via the optical filters 983, 984, and 985, whereby an image is formed on CCD 902. The CCD 902 photoelectrically converts the incident light into an electric signal, which then is output from the CCD 902.

The drive coil 920, the bobbin 922, the movable base 952, and the CCD 902 constitute a movable portion 960. When a current flows through the drive coil 920, the movable portion 960 is guided by the guide shafts 951a and 951b and integrally moves in the optical axis direction. An autofocus operation is performed by changing the relative distance between the lenses 981 and 982 and the CCD 902 in this manner. That is to say, an autofocus function is performed by controlling the current flowing through the drive coil 920.

DISCLOSURE OF INVENTION

Problem to be Solved by the Invention

In recent years, portable equipment, such as a cellular phone, provided with a camera has become widespread. As the portable equipment is made smaller, thinner, and more multifunctional, there is a demand for a smaller, thinner, and more multifunctional camera module.

However, as in the above-described conventional camera module 900, if the movable base 952 is made movable in the optical axis direction by fitting the guide shafts 951a and 951b in the fitting holes 952a and 952b, respectively, a great amount of friction is caused. Due to this friction, the voice coil motor 953 needs to have a large power, and the permanent magnet 924 and the like thus need to be large. This increases the size of the voice coil motor 953, so that the camera module cannot be made smaller or thinner. Moreover, in order to increase the power of the voice coil motor 953, it is necessary to increase a current flowing through the drive coil 920, which leads to an increase in power consumption.

The present invention was made in light of the foregoing problem, and it is an object of the present invention to provide an autofocus camera module that can be made smaller and thinner and can achieve a reduction in power consumption.

Means for Solving Problem

A camera module according to the present invention includes: a lens portion including at least one lens; an imaging element having a light-receiving surface that is substantially perpendicular to an optical axis direction of the lens; a fixed portion provided on an outer peripheral side of the lens portion; a first elastic body that is provided on a side opposite to the imaging element side with respect to the lens and couples the lens portion and the fixed portion; and a second elastic body that is provided on the imaging element side with respect to the lens and couples the lens portion and the fixed portion. In this camera module, the first elastic body and the second elastic body have the same shape, the first elastic body and the second elastic body are arranged so as to oppose each other while sharing a common central axis, and the second elastic body is arranged so that the shape of the second elastic body is different from a shape of the first elastic body projected in the optical axis direction of the lens.

EFFECTS OF THE INVENTION

According to the present invention, it is possible to provide an autofocus camera module that can be made smaller and thinner and can achieve a reduction in power consumption.

DESCRIPTION OF THE INVENTION

Figure 1:
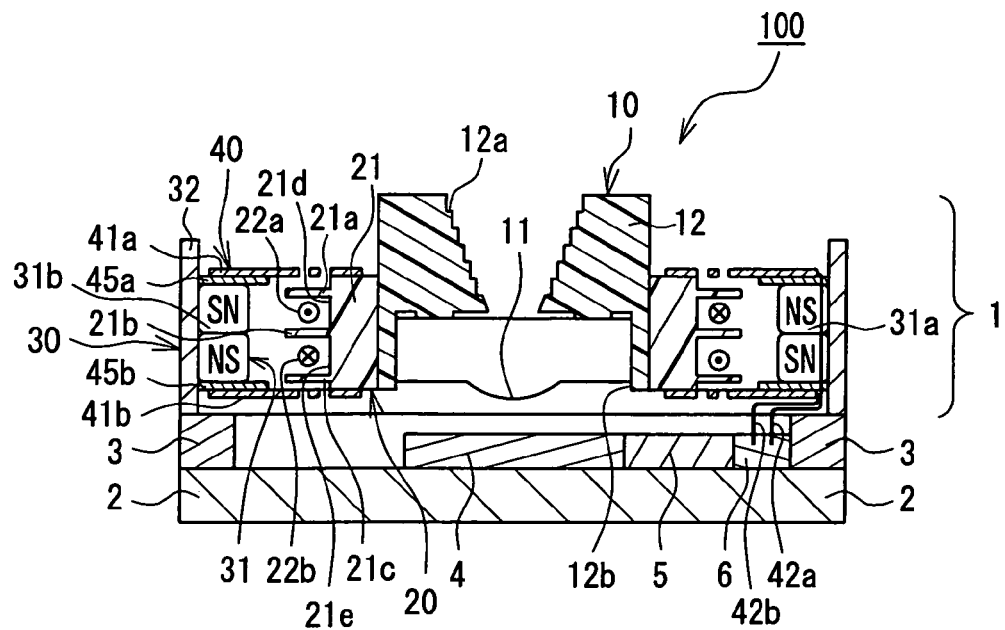
FIG. 1 is a sectional view showing a configuration of a camera module according to Embodiment 1 of the present invention.

In the camera module according to the present invention, the first elastic body and the second elastic body have the same shape, and the second elastic body is arranged so that the shape of the second elastic body is different from a shape of the first elastic body projected in the optical axis direction of the lens. Therefore, friction caused when changing the relative distance between the lens and the imaging element is negligible. Accordingly, it is possible to provide a small and thin camera module with a focus control function, achieving low power consumption. Moreover, the occurrence of a tilt of the lens portion can be suppressed, so that a good image can be formed on the imaging element at all times. Accordingly, it is possible to provide a camera module that produces a good image.

Furthermore, in the camera module according to the present invention, it is preferable that the second elastic body is arranged such that the first elastic body is moved substantially parallel to the optical axis direction of the lens and then is inverted symmetrically with respect to an axis perpendicular to an optical axis of the lens. Therefore, friction caused when changing the relative distance between the lens and the imaging element is negligible. Accordingly, it is possible to provide a small and thin camera module with a focus control function, achieving low power consumption. Moreover, the occurrence of a tilt of the lens portion can be suppressed, so that a good image can be formed on the imaging element at all times. Accordingly, it is possible to provide a camera module that produces a good image.

Furthermore, in the camera module according to the present invention, it is preferable that the second elastic body is arranged such that the first elastic body is moved substantially parallel to the optical axis direction of the lens and then is rotated about an optical axis of the lens. In other words, the first elastic body and the second elastic body are arranged so as to have a phase shift. Therefore, friction caused when changing the relative distance between the lens and the imaging element is negligible. Accordingly, it is possible to provide a small and thin camera module with a focus control function, achieving low power consumption. Moreover, the occurrence of a tilt of the lens portion can be suppressed, so that a good image can be formed on the imaging element at all times. Accordingly, it is possible to provide a camera module that can produce a good image.

Furthermore, in the camera module according to the present invention, it is preferable that each of the first elastic body and the second elastic body includes an outer annular portion connected to the fixed portion, an inner annular portion connected to the lens portion, and N (N is an integer of 2 or more) arms connecting the outer annular portion and the inner annular portion and that the second elastic body is arranged such that the first elastic body is moved substantially parallel to the optical axis direction of the lens and then is rotated $(180/N)°$ substantially about the optical axis of the lens. With this configuration, the phase shift between the first elastic body and the second elastic body is at its maximum, which allows the camera module to be well balanced and the tilt to be minimized.

Furthermore, in the camera module according to the present invention, it is preferable that: the lens portion comprises a plurality of lenses; each of the first elastic body and the second elastic body includes an outer annular portion connected to the fixed portion, an inner annular portion provided on an inner side of the outer annular portion, and at least one arm connecting the outer annular portion and the inner annular portion; and the inner annular portion is supported at a substantially central position of the lens portion. This prevents the camera module from extending in the radial direction of the lens module, thus allowing the camera module to be made smaller. Moreover, friction caused when changing the relative distance between the lens and the imaging element is negligible. Accordingly, it is possible to provide a thin camera module with a focus control function, achieving low power consumption Furthermore, in the camera module according to the present invention, it is preferable that: the lens portion comprises a plurality of lenses; each of the first elastic body and the second elastic body includes an outer annular portion connected to the fixed portion, an inner annular portion connected to the lens portion, and arms connecting the outer annular portion and the inner annular portion; and the number of the arms provided in each of the first elastic body and the second elastic body is the same as the number of the lenses. With this configuration, it is possible to arrange the first elastic body and the second elastic body so that the arms do not block light incident on the lenses. Effective use of the space thus becomes possible, so that a thin camera module can be provided.

Furthermore, in the camera module according to the present invention, it is preferable that: a coil is provided on the outer peripheral side of the lens portion; the fixed portion includes a permanent magnet portion for generating a magnetic field in the coil and a yoke that is formed of a ferromagnetic material and is arranged on an outer peripheral side of the permanent magnet portion; and the coil, the permanent magnet portion, and the yoke constitute an actuator for changing a relative position of the lens with respect to the imaging element. With this configuration, the yoke is not present on the inner peripheral side of the permanent magnet portion or above or below the permanent magnet portion. Accordingly, it is possible to provide a thin camera module whose size in the radial direction of the lens is reduced.

Furthermore, in the camera module according to the present invention, it is preferable that the first elastic body and the second elastic body are electrically conductive and that each of the first elastic body and the second elastic body is connected to the permanent magnet portion via an insulating sheet that is electrically insulating. Thus, it is possible to insulate the permanent magnet portion from the first elastic body and the second elastic body. Furthermore, since the insulating sheet is thin, it does not substantially increase the thickness of the camera module.

Furthermore, it is preferable that the camera module according to the present invention further includes: a driving element for supplying electric power to the actuator; and a controlling element for performing an arithmetic processing with respect to an electric signal from the imaging element, wherein a distance between the imaging element and the driving element is longer than a distance between the imaging element and the controlling element. With this configuration, the imaging element is spaced apart from the driving element. This prevents the driving element from causing noise in the imaging element, so that a camera module that produces a good image can be provided.

Furthermore, in the camera module according to the present invention, it is preferable that the coil is formed by winding a wire around an outer periphery of the lens. With this configuration, it is not necessary to provide a component for forming the coil in the camera module, which allows the camera module to be made smaller. Moreover, since the number of required components is reduced, it is also possible to achieve cost reduction.

Furthermore, in the camera module according to the present invention, it is preferable that the lens has an electrode connected electrically to the coil and that each of the first elastic body and the second elastic body is electrically conductive and in contact with the electrode. With this configuration, by attaching the first elastic body and the second elastic body to the lens, it is possible to connect the electrode to the first elastic body and the second elastic body. Thus, a space required for soldering is no longer necessary, so that the size of the camera module can be reduced accordingly.

Furthermore, in the camera module according to the present invention, it is preferable that the permanent magnet portion and the coil are arranged inside the yoke and between the first elastic body and the second elastic body. This prevents the camera module from extending in the radial direction and the optical axis direction of the lens, thus allowing the camera module to be made smaller and thinner.

Hereinafter, embodiments of the present invention will be described specifically with reference to the accompanying drawings.

Embodiment 1

A camera module according to Embodiment 1 of the present invention will be described with reference to the drawings. FIG. 1 is a sectional view showing a configuration of a camera module according to Embodiment 1 of the present invention.

As shown in FIG. 1, a camera module 100 includes a lens module 1, a substrate 2, a supporting portion 3, an imaging element 4, a controlling element 5, and a driving element 6. The lens module 1 includes a lens portion 10, a movable base 20, a fixed base 30, and a coupling portion 40.

The lens portion 10 has a lens 11 and a lens holder 12. The lens 11, which is obtained by shaping glass, resin, or the like by injection molding or cutting, serves to refract light incident thereon. Desirably, the lens 11 is formed of a material having a high refractive index and low dispersibility. The lens holder 12 is produced by shaping resin or the like by injection molding or the like. The lens holder 12 has a substantially cylindrical shape, and has an opening 12b whose diameter is constant and an opening 12a whose diameter is tapered off. The lens 11 is provided in this opening 12b by press-fitting or the like. The opening 12a is provided on a side farther from the imaging element 4, while the opening 12b is provided on the imaging element 4 side. Incident light enters the lens 11 after being converged by the opening 12a, and passes through the lens 11 to be emitted from the opening 12b to the imaging element 4.

The movable base 20 has a movable base holder 21, an upper coil 22a, and a lower coil 22b. The movable base holder 21 is obtained by forming resin or the like into a substantially cylindrical shape by injection molding or the like. The lens portion 10 is disposed inside the movable base holder 21 by press-fitting or the like. The upper coil 22a and the lower coil 22b are wound on the outer periphery of the movable base holder 21. The lower coil 22b is provided at a lower part (the substrate 2 side) of the movable base holder 21 while the upper coil 22a is provided at an upper part of the movable base holder 21.

The fixed base 30 has the permanent magnet portion 31 and the yoke 32. The permanent magnet portion 31 is composed of four permanent magnets and is arranged so that magnetic flux is generated in the radial direction of the lens 11. It is to be noted here that, out of these four permanent magnets, FIG. 1 shows only the permanent magnets 31a and 31b and does not show the remaining two permanent magnets. The yoke 32 is obtained by forming a ferromagnetic material, such as iron, whose surfaces have been plated, into a cylindrical shape. Inside the yoke 32, the four permanent magnets (the permanent magnet portion 31) including the permanent magnets 31a and 31b are fixed firmly. The yoke 32 is placed on the upper part of the supporting portion 3.

The coupling portion 40 has an upper spring 41a, a lower spring 41b, and an upper insulating sheet 45a and a lower insulating sheet 45b that are provided on upper and lower ends of the permanent magnet portion 31, respectively. The upper spring 41a is formed of a metal that has high electrical conductivity and is highly resistant to metal fatigue, for example, and can be obtained by punching out a plate-like member formed of such a metal into a predetermined shape with a press or the like. The shape of the upper spring 41a will be described later. The inner peripheral side of the upper spring 41a is connected to the upper part of the movable base holder 21, and the outer peripheral side of the upper spring 41a is connected to the upper insulating sheet 45a provided on the upper end of the permanent magnet portion 31. The lower spring 41b has the same structure as the upper spring 41a. The inner peripheral side of the lower spring 41b is connected to the lower part of the movable base holder 21, and the outer peripheral side of the lower spring 41b is connected to the lower insulating sheet 45b provided on the lower end of the magnet portion 31. That is, the upper spring 41a is arranged on a side farther from the imaging element 4 with respect to the center of the lens 11 in the optical axis direction of the lens 11, and the lower spring 41b is arranged on a side closer to the imaging element 4 with respect to the center of the lens 11 in the optical axis direction of the lens 11. Furthermore, the fixed base 30 and the lens portion 10 are coupled to each other via the movable base 20 and the upper spring 41a and via the movable base 20 and the lower spring 41b.

Furthermore, an upper wire 42a and a lower wire 42b, each being composed of a wire or a metal film pattern, are provided. One end of the upper wire 42a is connected to the outer peripheral side of the upper spring 41a, and the other end of the upper wire 42a is connected to the driving element 6. One end of the lower wire 42b is connected to the outer peripheral side of the lower spring 41b, and the other end of the lower wire 42b is connected to the driving element 6. Furthermore, although not shown in FIG. 1, the inner peripheral side of the upper spring 41a is connected electrically to one end of the winding of the upper coil 22a, and the inner peripheral side of the lower spring 41b is connected electrically to the other end of the winding of the lower coil portion 22b.

The substrate 2 is composed of an epoxy resin, a ceramic substrate, a silicon substrate, or the like. The supporting portion 3 is obtained by forming resin or the like into a substantially cylindrical shape by, for example, injection molding. The supporting portion 3 is fixed firmly to the upper surface of the substrate 2 with an adhesive, a solder, or the like, or alternatively is fixed through fitting by being swaged, thereby allowing the fixed base 30 to be fixed to the substrate 2.

The imaging element 4 may include a CCD or CMOS and is arranged on the upper surface of the substrate 2, for example, by being soldered thereto. The imaging element 4 is arranged so that the center of a light-receiving surface of the imaging element 4 coincides with the optical axis of the lens 11 and the light-receiving surface of the imaging element 4 is substantially perpendicular to the optical axis of the lens 11. When light from a subject enters the camera module 100, it reaches the imaging element 4 via the lens 11, whereby an image is formed on the imaging element 4. The imaging element 4 photoelectrically converts the incident light into an electric signal, which then is output from the imaging element 4.

The controlling element 5 is provided beside the imaging element 4 on the upper surface of the substrate 2 by soldering or the like and is connected electrically to the imaging element 4 via a metal wiring of the substrate 2. The controlling element 5 includes, for example, either one or both of a DSP (Digital Signal Processor) and a CPU (Central Processing Unit). The controlling element 5 further includes a volatile memory such as a DRAM (Dynamic RAM) and a nonvolatile memory such as a ROM (Read Only Memory) or flash memory. The controlling element 5 further includes an imaging signal-input portion including a CDS (Correlated Double Sampling) circuit, an AGC (Automatic Gain Control), and an ADC (Analog to Digital Converter) and an imaging element-driving portion including a TG (Timing Generator) and a TG driving portion.

In the controlling element 5, the TG generates a signal, the electric power of which is then amplified by the TG driving portion. Thereafter, the signal is output from the controlling element 5 as an imaging element-driving signal. The imaging element 4 is driven based on this imaging element-driving signal. On the other hand, an electric signal from the imaging element 4 is input to the controlling element 5, where the CDS eliminates the noise of the electric signal, the AGC adjusts the gain of the electric signal, and the ADC converts the electric signal is from an analog value to a digital value. After various arithmetic operations for image processing have been performed with respect to this digital value by the controlling element 5, the digital value is transmitted to an external output device such as a host CPU or a liquid crystal display.

The driving element 6 is provided beside the controlling element 5 on the upper surface of the substrate 2 by soldering or the like and is connected electrically to the controlling element 5 via an electrical wiring of the substrate 2. The driving element 6 is connected to the upper wire 42a and the lower wire 42b, and includes a MOS-FET (Metal-Oxide Semiconductor Field-Effect Transistor) and the like. The driving element 6 applies a voltage between the upper wire 42a and the lower wire 42b based on a command generated by the controlling element 5. As a result, a voltage is applied to the upper coil 22a and the lower coil 22b.

Figure 2:
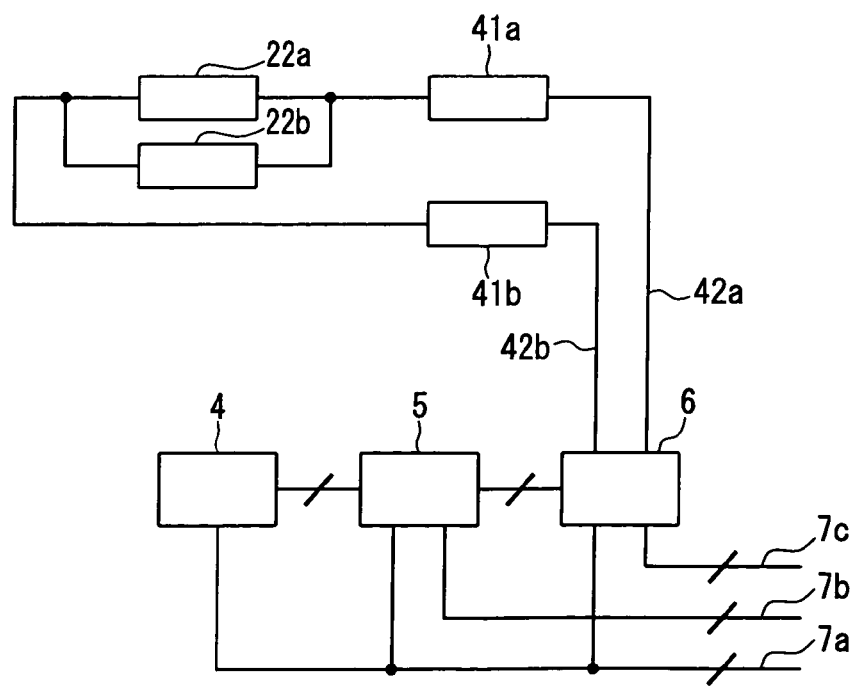
FIG. 2 is a circuit diagram of the camera module according to Embodiment 1 of the present invention.

FIG. 2 is a circuit diagram of the camera module according to Embodiment 1 of the present invention. In the following, the camera module will be described further with reference to FIG. 2. An arithmetic power line 7a is connected to the imaging element 4, the controlling element 5, and the driving element 6 so as to supply electric power thereto. A communication line 7b is connected to the controlling element 5 so as to exchange information between the controlling element 5 and, for example, the external output device. A driving power line 7c is connected to the driving element 6 so as to supply electric power thereto. Although not shown in FIG. 1, the arithmetic power line 7a, the communication line 7b, and the driving power line 7c are formed as a metal pattern on the substrate 2.

The upper wire 42a and the lower wire 42b connected to the driving element 6 are connected to the upper spring 41a and the lower spring 41b, respectively. The upper spring 41a and the lower spring 41b are connected to each other via the upper coil 22a and the lower coil 22b that are connected in parallel. It is to be noted here that the upper coil 22a and the lower coil 22b may be connected in series. Connecting the upper coil 22a and the lower coil 22b in parallel is advantageous in that the electric resistance becomes smaller, thus reducing the resistance loss. On the other hand, connecting the upper coil 22a and the lower coil 22b in series is advantageous in that, even if an electric resistance varies between the coils, variations in Lorentz force caused in the coils can be reduced because the same current flows through the coils.

Figure 3:
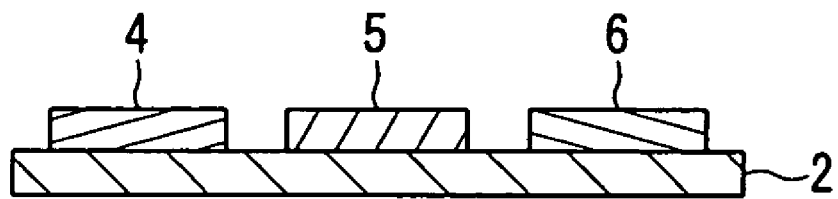
FIG. 3 is a sectional view for illustrating an arrangement of an imaging element, a controlling element, and a driving element in the camera module according to Embodiment 1 of the present invention.
Figure 4:
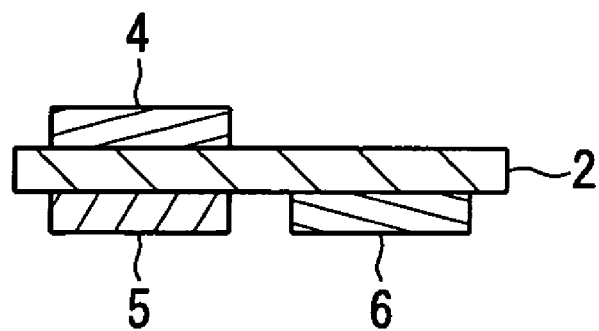
FIG. 4 is a sectional view for illustrating another arrangement of the imaging element, the controlling element, and the driving element in the camera module according to Embodiment 1 of the present invention.

FIG. 3 is a sectional view for illustrating an arrangement of the imaging element, the controlling element, and the driving element in the camera module according to Embodiment 1 of the present invention. In the following, the camera module will be described further with reference to FIG. 3. FIG. 3 shows the imaging element 4, the controlling element 5, and the driving element 6 provided on the substrate 2 in the camera module 100 according to Embodiment 1. Preferably, on the substrate 2, the imaging element 4 and the driving element 6 are arranged on opposite sides with respect to the controlling element 5, as shown in FIG. 3. With this arrangement, it is possible to reduce the influence of noise caused by the driving element 6 on the imaging element 4. FIG. 4 is a sectional view for illustrating another arrangement of the imaging element, the controlling element, and the driving element in the camera module according to Embodiment 1 of the present invention. In the following, the camera module will be described further with reference to FIG. 4. FIG. 4 shows an arrangement of the imaging element 4, the controlling element 5, and the driving element 6 different from that shown in FIG. 3. As shown in FIG. 4, the imaging element 4 and the driving element 6 may be arranged so that they are on different surfaces of the substrate 2 and spaced apart from each other.

The imaging element 4 provides a small output voltage and thus is susceptible to the influence of noise. On the other hand, the driving element 6 causes a high level of noise because a current and a voltage vary widely in the driving element 6 due to PWM switching or the like. Accordingly, when the imaging element 4 and the driving element 6 are arranged in close proximity to each other, the noise caused by the driving element 6 influences the imaging element 4 so that a good image cannot be obtained. Thus, by arranging the imaging element 4 and the driving element 6 so that they are spaced apart from each other as shown in FIGS. 3 and 4, it is possible to reduce the influence of the noise on the imaging element 4. It is to be noted here that, in the case where blocks respectively serving as the imaging element 4, the controlling element 5, and the driving element 6 are mounted on a single chip, it is also desirable that the block serving as the imaging element 4 and the block serving as the driving element 6 are arranged so that they are spaced apart from each other.

Furthermore, in order to prevent noise from entering the signal line connecting the imaging element 4 and the controlling element 5, it is desirable that the signal line connecting the imaging element 4 and the controlling element 5 is arranged so as not to intersect with other wirings. In particular, it is desirable that the signal line is arranged so as not to intersect with a wiring through which a large current flows or a wiring in which a voltage varies widely. For example, it is desirable that the signal line is arranged so as not to intersect with the arithmetic power line 7a, the communication line 7b, the driving power line 7c, the upper wire 42a, or the lower wire 42b. This allows the influence of the noise to be reduced so that the camera module 100 can form a good image.

Since the driving element 6 provides a large output current, the electric power required varies widely so that a current supplied to the driving element 6 changes abruptly. Therefore, due to the influence of an inductance component and a resistance component of the power line or the delay in response of the power supply, voltage variation, for example, is caused in the driving element 6. If electric power is supplied to the imaging element 4, the controlling element 5, and driving element 6 through the same power line, the imaging element 4 and the controlling element 5 also may be subjected to the influence of the variation in the power supply voltage due to the variation in the current supplied to the driving element 6. This may lead to malfunction of the imaging element 4 and the controlling element 5. However, by providing two power lines, namely, the arithmetic power line 7a and the driving power line 7c, in the camera module 100 as shown in FIG. 2, it is possible to prevent the malfunction of the imaging element 4 and the controlling element 5. The arithmetic power line 7a is connected to the imaging element 4, the controlling element 5, and the driving element 6 so as to supply electric power thereto. The driving power line 7c is connected to the coils 22a and 22b via the driving element 6 so as to supply electric power thereto. With such a configuration, even in the case where voltage variation is caused in the driving power line 7c, the voltage variation does not influence the imaging element 4 or the controlling element 5, so that the malfunction does not occur.

Next, a focus control function of this camera module 100 will be described. A voltage is applied so that the potential of the upper wire 42a is higher than that of the lower wire 42b, thereby causing a current to flow through the upper coil 22a and the lower coil 22b. The upper coil 22a and the lower coil 22b are wired so that the current flows through the upper coil 22a counterclockwise and through the lower coil 22b clockwise when viewed from the top (the light entrance side) of the lens module 1.

As shown in FIG. 1, the upper part of each of the permanent magnets (the permanent magnets 31a and 31b and the remaining two permanent magnets) is magnetized so that an inner side thereof becomes an N pole and an outer side thereof becomes an S pole. The lower part of each of the permanent magnets (the permanent magnets 31a and 31b and the remaining two permanent magnets) is magnetized so that an inner side thereof becomes an S pole and an outer side thereof becomes an N pole. With such a configuration, due to the interaction (Lorentz force) between the magnetic fluxes caused by the respective permanent magnets (the permanent magnets 31a and 31b and the remaining two permanent magnets) and the current flowing through the upper coil 22a and the lower coil 22b, an upward force is applied to the upper coil 22a and the lower coil 22b. The lens portion 10 and the movable base 20 integrally move upward until they reach a position where this upward force balances the force (Hooke's force) caused by the deformation of the upper spring 41a and the lower spring 41b. Thus, the relative distance between the lens 11 and the imaging element 4 increases.

The movement amount of the lens portion 10 and the movable base 20 is proportional to the Lorentz force, the Lorentz force is proportional to the current flowing through the upper coil 22a and the lower coil 22b, and the current is proportional to the voltage between the upper wire 42a and the lower wire 42b. Therefore, the controlling element 5 can control the relative distance between the lens 11 and the imaging element 4 by controlling the voltage between the upper wire 42a and the lower wire 42b using the driving element 6. That is, the upper coil 22a, the lower coil 22b, the yoke 32, and the respective permanent magnets (the permanent magnets 31a and 31b and the remaining two permanent magnets) constitute an actuator.

As described above, when incident light from a subject reaches the imaging element 4 via the lens 11 to form an image on the light-receiving surface of the imaging element 4, the image is in focus if the relative distance between the lens 11 and the imaging element 4 is appropriate, resulting in a clear image on the imaging element 4. The imaging element 4 photoelectrically converts this optical signal into an electric signal, which then is output from the imaging element 4. The electric signal output from the imaging element 4 then is input to the controlling element 5. Based on the input signal, the controlling element 5 determines that the image obtained is clear and maintains the voltage command to the driving element 6. Thus, the driving element 6 maintains the voltage between the upper wire 42a and the lower wire 42b, whereby the relative distance between the lens 11 and the imaging element 4 is maintained.

On the other hand, the image is out of focus if the relative distance between the lens 11 and the imaging element 4 is not appropriate, resulting in an unclear image on the imaging element 4. The imaging element 4 photoelectrically converts this optical signal into an electric signal, which then is output from the imaging element 4. The electric signal output from the imaging element 4 then is input to the controlling element 5. Based on the input signal, the controlling element 5 determines that the image obtained is unclear and changes the voltage command to the driving element 6. Thus, the driving element 6 changes the voltage between the upper wire 42a and the lower wire 42b, whereby the relative distance between the lens 11 and the imaging element 4 is changed. This operation is repeated until an appropriate relative distance between the lens 11 and the imaging element 4 is obtained. In this manner, the camera module 100 realizes a focus control function. It is also possible to realize a magnified picture function by arranging a plurality of lenses so that their optical axes substantially coincide with each other and moving a specific lens by the above-described mechanism.

Figure 5A:
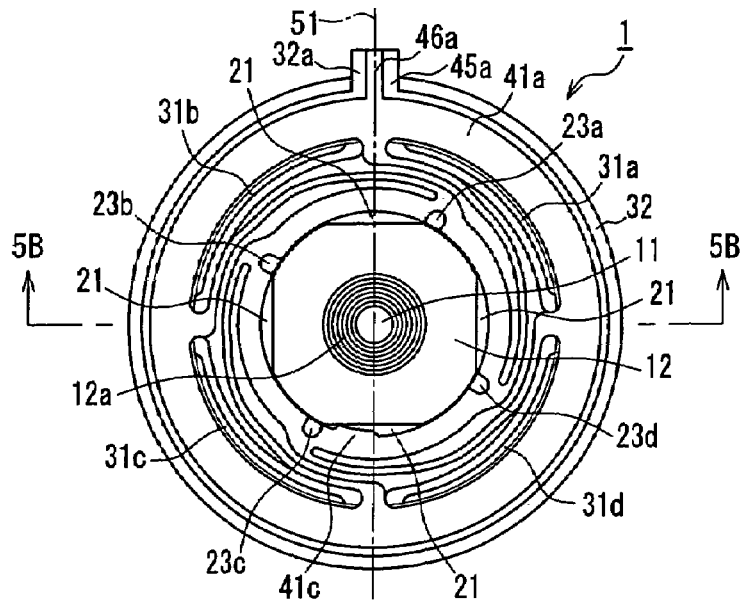
FIG. 5A is a plan view showing a configuration of a lens module according to Embodiment 1 of the present invention.
Figure 5B:
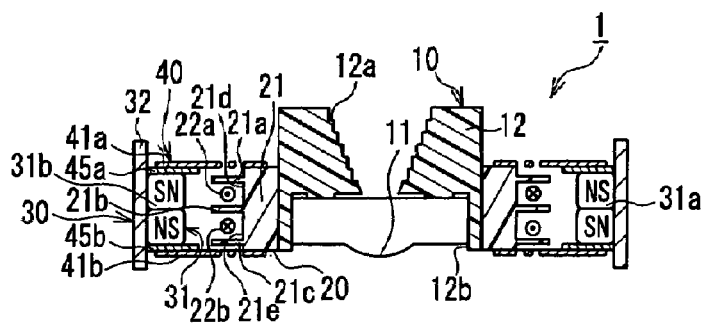
FIG. 5B is a sectional view showing the configuration of the lens module according to Embodiment 1 of the present invention.
Figure 5C:
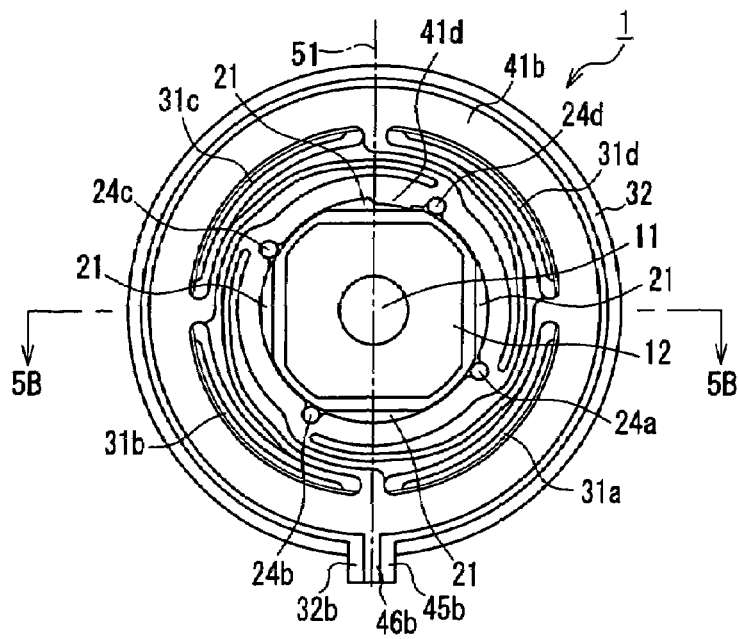
FIG. 5C is a bottom view showing the lens module according to Embodiment 1 of the present invention.

Next, the lens module according to Embodiment 1 will be described in detail. FIG. 5A is a plan view showing a configuration of the lens module according to Embodiment 1 of the present invention, FIG. 5B is a sectional view showing the configuration of the lens module according to Embodiment 1 of the present invention, and FIG. 5C is a bottom view showing the lens module according to Embodiment 1 of the present invention. Note here that FIG. 5B is a sectional view taken along an arrow line 5B-5B in FIGS. 5A and 5C, viewed in a direction indicated by arrows.

FIGS. 5A, 5B and 5C show the configuration of the lens module 1 of the camera module shown in FIG. 1 in further detail. The lens module 1 will be described more specifically with reference to FIGS. 5A, 5B, and 5C. The lens module 1 has the lens portion 10, the movable base 20, the fixed base 30, and the coupling portion 40.

The lens portion 10 has the lens 11 and the lens holder 12. The lens 11, which is obtained by shaping glass, resin, or the like by injection molding or cutting, serves to refract light incident thereon. Desirably, the lens 11 is formed of a material having a high refractive index and low dispersibility. The lens holder 12 is produced by shaping resin or the like by injection molding or the like. The lens holder 12 has a substantially cylindrical shape, and has an opening 12b whose diameter is constant and an opening 12a whose diameter is tapered off. The lens 11 is provided in this opening 12b by press-fitting or the like. The opening 12a is provided on a side farther from the imaging element 4, while the opening 12b is provided on the imaging element 4 side. Incident light enters the lens 11 after being converged by the opening 12a, and passes through the lens 11 to be emitted from the opening 12b.

The movable base 20 has the movable base holder 21, the upper coil 22a, and the lower coil 22b. The movable base holder 21 is obtained by forming resin or the like into a substantially cylindrical shape by injection molding or the like. The lens portion 10 is disposed inside the movable base holder 21 by press-fitting or the like. Furthermore, three annular protrusions 21a, 21b, and 21c are formed on an outer peripheral portion of the movable base holder 21. A groove-like bobbin portion 21d is formed by the protrusions 21a and 21b and the outer peripheral portion of the movable base holder 21. A groove-like bobbin portion 21e is formed by the protrusions 21b and 21c and the outer peripheral portion of the movable base holder 21. The upper coil 22a is wound around the bobbin portion 21d, and the lower coil 22b is wound around the bobbin portion 21e. Since the upper coil 22a and the lower coil 22b are wound around the groove-like bobbin portions 21d and 21e, it is possible to wind the coils easily without the fear that the coils might be displaced. It is to be noted here that, even in the case where the protrusions 21a and 21c are not formed, a jig or the like that can substitute for the protrusions may be used only when winding the upper coil 22a and the lower coil 22b. In this case, the upper coil 22a and the lower coil 22b may be formed by winding a self-welding wire and the jig may be removed after the welding.

Figure 6:
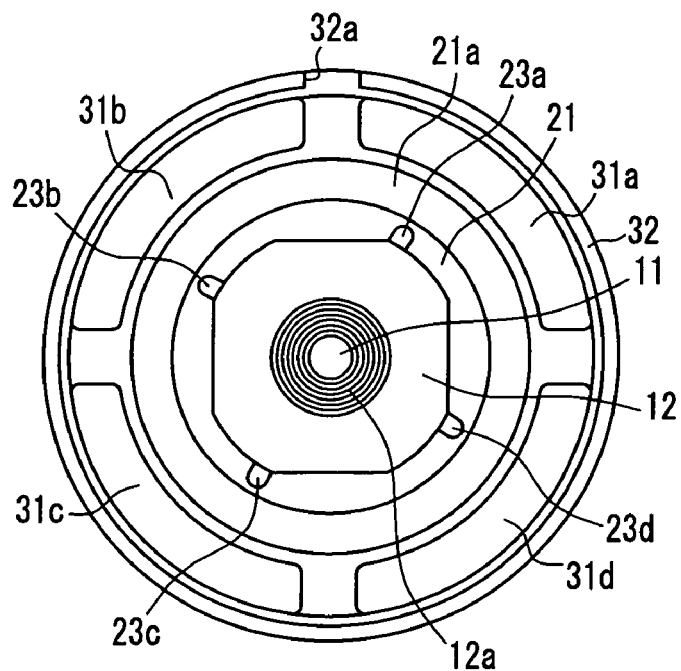
FIG. 6 is a plan view showing the lens module according to Embodiment 1 of the present invention in the state where a coupling portion is removed therefrom.

The fixed base 30 has a permanent magnet portion 31 and a yoke 32. The permanent magnet portion 31 is composed of the four permanent magnets 31a, 31b, 31c, and 31d as shown in FIGS. 5A and 5C, for example. FIG. 6 is a plan view showing the lens module according to Embodiment 1 of the present invention in the state where a coupling portion is removed therefrom. In the following, the lens module will be described further with reference to FIG. 6. By removing the upper spring 41a and the upper insulating sheet 45a, the arrangement of the four permanent magnets 31a, 31b, 31c, and 31d can be seen more clearly. Each of these permanent magnets 31a, 31b, 31c, and 31d is arranged so that magnetic flux is generated in the radial direction of the lens 11. The permanent magnets 31a, 31b, 31c, and 31d are formed by cutting a surface-treated neodymium sintered magnet with a cylindrical shape so as to obtain four arc-shaped pieces whose central angle is slightly smaller than 90° (about 80°). Out of the permanent magnets 31a, 31b, 31c, and 31d, those magnetized so that an inner side thereof in the radial direction of the lens 11 becomes an N pole are arranged in the upper part, while those having the same shape and magnetized so that an inner side thereof in the radial direction of the lens 11 becomes an S pole are arranged in the lower part.

The yoke 32 is obtained by forming a ferromagnetic material, such as iron, whose surfaces have been plated, into a cylindrical shape. The inner periphery of the yoke 32 has the same curvature as the outer peripheries of the permanent magnets 31a, 31b, 31c, and 31d constituting the permanent magnet portion 31. The permanent magnets 31a, 31b, 31c, and 31d are fixed firmly inside the yoke 32 with an adhesive or the like, and the yoke 32 is disposed on the upper part of the supporting portion 3 (see FIG. 1). That is, the yoke 32 is arranged so as to be connected to the outer side of the permanent magnet portion 31 in the magnetization direction.

The upper coil 22a and the lower coil 22b are arranged so as to form a gap on the inner side of the permanent magnet portion 31. The yoke 32 is disposed only on the outer peripheral portion of the permanent magnet portion 31, and no yoke is disposed on the inner side of the permanent magnet portion 31. Thus, since the lens module is configured so that the yoke 32 is not present in the inner peripheral portion of the permanent magnet portion 31, the size of the lens 11 in the radial direction can reduced, thereby allowing the size of the voice coil motor in the radial direction to be reduced. Moreover, since the yoke 32 is not present above or below the permanent magnet portion 31, the thickness of the lens module can be reduced accordingly. Therefore, the camera module 100 can be made smaller. Furthermore, because the permanent magnet portion 31, the upper coil 22a, and the lower coil 22b are arranged inside the yoke 32 and between the upper spring 41a and the lower spring 41b, the camera module 100 can be made thinner.

The shape of the upper spring 41a will be described later. The inner peripheral side of the upper spring 41a is connected to the upper part of the movable base holder 21, and the outer peripheral side of the upper spring 41a is connected to the insulating sheet 45a provided on the upper end of the permanent magnet portion 31.

The coupling portion 40 has the upper spring 41a, the lower spring 41b, and the upper insulating sheet 45a and the lower insulating sheet 45b that are provided on the upper and lower ends of the permanent magnet portion 31, respectively. The upper spring 41a and the lower spring 41b are formed of a metal that has high electrical conductivity and is highly resistant to metal fatigue, such as a beryllium copper alloy or the like, and can be obtained by punching out a plate-like member formed of such a metal into a predetermined shape with a press or the like. The upper spring 41a is arranged on a side farther from the imaging element 4 (see FIG. 1) with respect to the center in the optical axis direction of the lens 11. The inner peripheral side of the upper spring 41a is connected to the upper part of the movable base holder 21, and the outer peripheral side of the upper spring 41a is connected to the upper insulating sheet 45a provided on the upper end of the magnet portion 31. The lower spring 41b is arranged on a side closer to from the imaging element 4 with respect to the center in the optical axis direction of the lens 11. The inner peripheral side of the lower spring 41b is connected to the lower part of the movable base holder 21, and the outer peripheral side of the lower spring 41b is connected to the lower insulating sheet 45b provided on the lower end of the permanent magnet portion 31. Thus, the coupling portion 40 couples the lens portion 10 and the fixed base 30 via the movable base holder 21.

Figure 7:
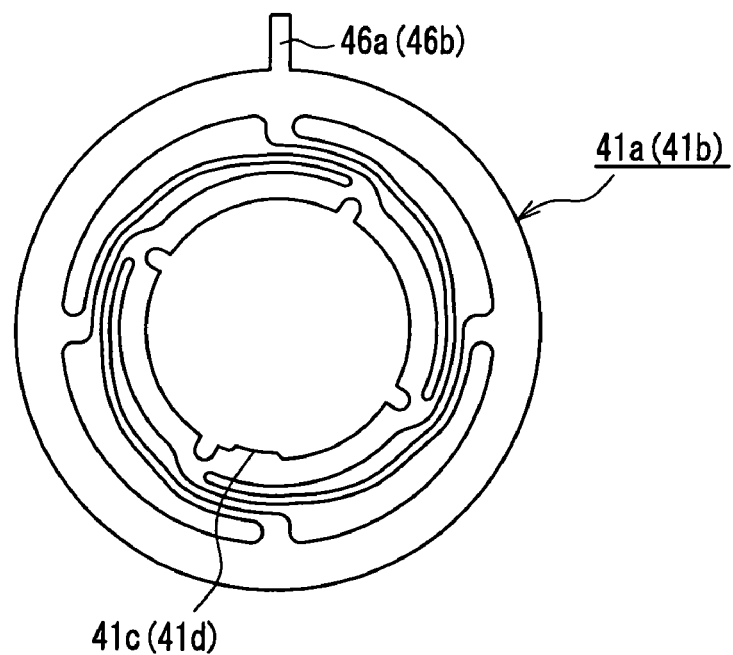
FIG. 7 is a plan view showing a configuration of an upper spring (a lower spring) according to Embodiment 1 of the present invention.

FIG. 7 is a plan view showing a configuration of an upper spring (a lower spring) according to Embodiment 1 of the present invention. More specifically, the upper spring 41a has annular portions at both inner and outer parts, and these annular portions are connected to each other with four arms. The lower spring 41b has the same structure as the upper spring 41a. In the following, the upper spring (the lower spring) will be described further with reference to FIG. 7.

The inner annular portion of the upper spring 41a has cut-away portions in which the protrusions 23a, 23b, 23c, and 23d provided in the movable base holder 21 can fit. The positioning of the upper spring 41a is achieved by fitting the protrusions 23a, 23b, 23c, and 23d in these cut-away portions, after which the upper spring 41a is fixed to the movable base holder 21 with an adhesive or the like. It is to be noted that, the inner annular portion of the upper spring 41a may be connected to the movable base holder 21 by, for example, press-fitting an annular-shaped resin in the outer periphery of the lens holder 12.

The inner annular portion of the lower spring 41b has cut-away portions in which the protrusions 24a, 24b, 24c, and 24d provided in movable base holder 21 can fit. The positioning of the lower spring 41b is achieved by fitting the protrusions 24a, 24b, 24c, and 24d in these cut-away portions, after which the lower spring 41b is fixed to the movable base holder 21 with an adhesive or the like. Since the positioning can be achieved easily as described above, it is not necessary to perform a position adjustment step, thus allowing the cost reduction of the camera module. It is to be noted that protrusions may be provided in the upper spring 41a and the lower spring 41b and cut-away portions in which these protrusions can fit may be formed in the movable base holder 21.

The upper spring 41a is connected to the fixed portion 30 by fixing the upper insulating sheet 45a to the permanent magnet portion 31 with an adhesive or the like and fixing the outer annular portion of the upper spring 41a to the upper insulating sheet 45a with an adhesive or the like. Similarly, the lower spring 41b is connected to the fixed portion 30 by fixing the lower insulating sheet 45b to the permanent magnet portion 31 with an adhesive or the like and fixing the outer annular portion of the lower spring 41b to the lower insulating sheet 45b with an adhesive or the like.

The outer annular portion of the upper spring 41a may be fixed to the yoke 32 by press-fitting an annular-shaped resin in the inner periphery of the yoke 32. Similarly, the outer annular portion of the lower spring 41b may be fixed to the yoke 32 by press-fitting an annular-shaped resin in the inner periphery of the yoke 32.

On the outer peripheries of the upper spring 41a and the lower spring 41b, protrusions 46a and 46b protruding outward are provided, respectively. On the other hand, cut-away portions 32a and 32b are formed in the yoke 32. The protrusions provided in the upper spring 41a and the lower spring 41b fit in these cut-away portions 32a and 32b, through which the positioning of the upper spring 41a and the lower spring 41b with respect to the yoke 32 is achieved. This eliminates the necessity of performing a position adjustment step, thus allowing the cost reduction of the camera module. It is to be noted that protrusions may be provided in the yoke 32 and cut-away portions in which these protrusions can fit may be formed in the upper spring 41a and the lower spring 41b.

The upper spring 41a is prevented from being in contact with the permanent magnets 31a, 31b, 31c, and 31d by the upper insulating sheet 45a provided therebetween, whereby the upper spring 41a is insulated electrically from the permanent magnets 31a, 31b, 31c, and 31d. Similarly, the lower spring 41b is prevented from being in contact with the permanent magnets 31a, 31b, 31c, and 31d by the lower insulating sheet 45b provided therebetween, whereby the lower spring 41b is insulated electrically from the permanent magnets 31a, 31b, 31c, and 31d. The upper insulating sheet 45a and the lower insulating sheet 45b are formed of, for example, resin or paper. By using such thin members as the upper insulating sheet 45a and the lower insulating sheet 45b, it is possible to prevent the thickness of the camera module 100 from increasing, thus allowing a thin camera module 100 to be realized. Furthermore, the upper insulating sheet 45a and the lower insulating sheet 45b may have the same configuration. The kinds of components to be used thus can be reduced, which contributes to the cost reduction of the camera module 100. The upper insulating sheet 45a and the lower insulating sheet 45b are arranged in such a manner that electrical insulation is established also at portions where the protrusions 46a and 46b of the upper spring 41a and the lower spring 41b fit in the cut-away portions 32a and 32b of the yoke 32, respectively. Furthermore, also in the case where protrusions are provided in the yoke 32 and cut-away portions in which the protrusions can fit are formed in the upper spring 41a and the lower spring 41b, the upper insulating sheet 45a and the lower insulating sheet 45b may be arranged so that electrical insulation is established at the portions where the protrusions fit in the cut-away portions.

One end of the winding of each of the upper coil 22a and the lower coil 22b is connected to a protrusion 41c provided on the inner annular portion of the upper spring 41a by soldering or the like. Thus, the upper coil 22a and the lower coil 22b are connected electrically to each other. The other end of the winding of each of the upper coil 22a and the lower coil 22b is connected to a protrusion 41d provided on the inner annular portion of the lower spring 41b by soldering or the like. Thus, the upper coil 22a and the lower coil 22b are connected electrically to each other.

That is, the upper wire 42a is connected electrically to one end of the winding of each of the upper coil 22a and the lower coil 22b via the upper spring 41a. On the other hand, the lower wire 42b is connected electrically to the other end of the winding of each of the upper coil 22a and the lower coil 22b via the lower spring 41b.

Figure 8:
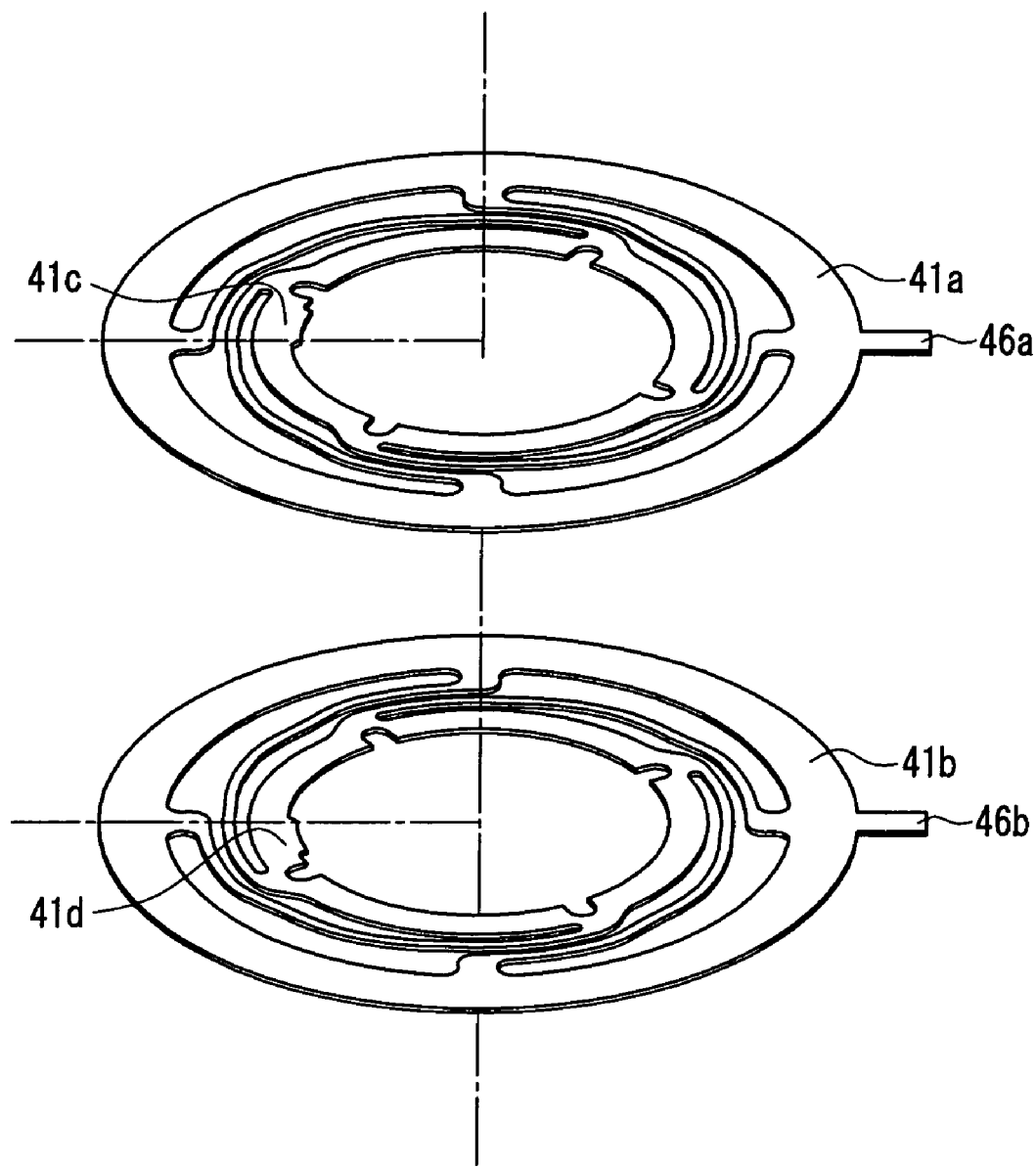
FIG. 8 is a perspective view showing an arrangement of the upper spring and the lower spring according to Embodiment 1 of the present invention.

Next, the arrangement of the upper spring 41a and the lower spring 41b will be described with reference to FIGS. 5A and 5C. The lower spring 41b is shaped and positioned such that, if the upper spring 41a were to be moved parallel to the optical axis direction of the lens 11 until it reached the location for the lower spring 41b and then were inverted 180° with respect to an axis 51 that is perpendicular to the optical axis of the lens 11, the lower spring 41b would be seen. When comparing FIG. 5A with FIG. 5C, it might seem that the lower spring 41b does not correspond to the inverted upper spring 41a. However, this is because FIG. 5A is a plan view, whereas FIG. 5C is a bottom view. At the time of their assembly, the upper spring 41a and the lower spring 41b are symmetrical to each other with respect to an axis indicated by the line 5B-5B. FIG. 8 is a perspective view showing an arrangement of the upper spring and the lower spring according to Embodiment 1 of the present invention. In the following, the arrangement of the upper spring 41a and the lower spring 41b will be described further with reference to FIG. 8. More specifically, FIG. 8 is a perspective view showing only the upper spring 41a and the lower spring 41b of the lens module 1 according to Embodiment 1. As shown in FIG. 8, the lower spring 41b is shaped and positioned such that, if the upper spring 41a were to be moved parallel to the optical axis direction of the lens 11 until it reached the location for the lower spring 41b and then were inverted 180° with respect to an axis 51 that is perpendicular to the optical axis of the lens 11, the lower spring 41b would be seen.

By configuring and positioning the two elastic bodies having the same shape (i.e., the upper spring 41a and the lower spring 41b) so that they can be considered to be inverted symmetrically relative to each other with respect to an axis perpendicular to the optical axis of the lens 11 as described above, the relative distance between the lens 11 and the imaging element 4 can be changed without causing friction. Moreover, since the upper spring 41a and the lower spring 41b are configured and positioned so that they can be considered to be inverted symmetrically relative to each other, the direction of the force unnecessary to the focus control generated in the upper spring 41a is different from that generated in the lower spring 41b. It is to be noted here that the force unnecessary to the focus control refers to the force acting in a direction other than the optical axis direction. Thus, these unnecessary forces cancel each other out. Therefore, the occurrence of a tilt of the lens portion 10 can be suppressed, so that a good image can be formed on the light-receiving surface of the imaging element 4 at all times. Accordingly, it is possible to provide a camera module that can produce a good image.

Furthermore, since the relative distance between the lens 11 and the imaging element 4 can be changed without causing friction, the thrust required can be reduced accordingly. Thus, for example, it is possible to make the permanent magnets 31a, 31b, 31c, and 31d smaller and to decrease the current flowing through the upper coil 22a and the lower coil 22b. Accordingly, it is possible to provide a small and thin camera module with a focus control function, achieving low power consumption.

The movable base holder 21 may be provided with a stopper that limits the displacement of the movable base 20. This limits the movement of the movable base 20, so that the deformation of the upper spring 41a and the lower spring 41b exceeding their breaking strength can be prevented. This results in an improved impact resistance.

As long as the upper spring 41a and the lower spring 41b are arranged so as to oppose each other while sharing a common central axis and the lower spring 41b is arranged so that the shape of the lower spring 41b is different from the shape of the upper spring 41a when projected in the optical axis direction of the lens 11, it is possible to obtain the same effect as in Embodiment 1.

Embodiment 2

Figure 9A:
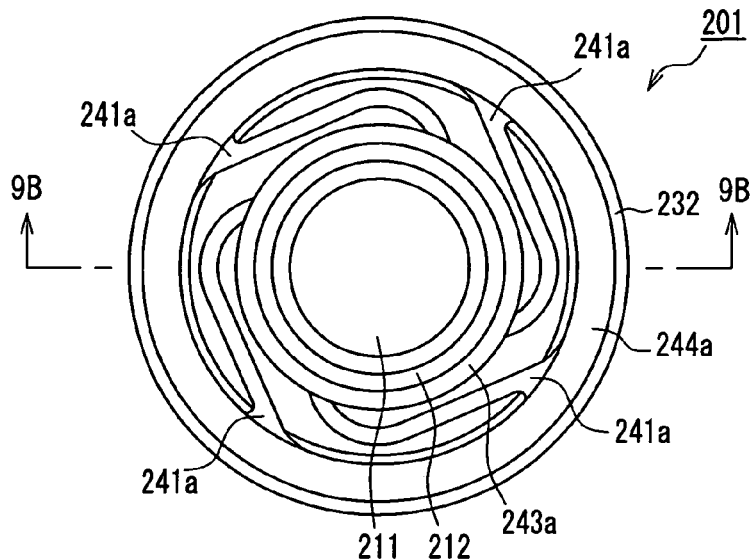
FIG. 9A is a plan view showing a configuration of a lens module according to Embodiment 2 of the present invention.
Figure 9B:
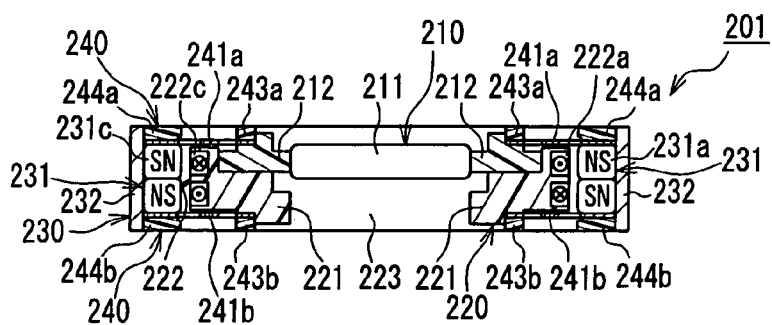
FIG. 9B is a sectional view showing the lens module according to Embodiment 2 of the present invention.
Figure 9C:
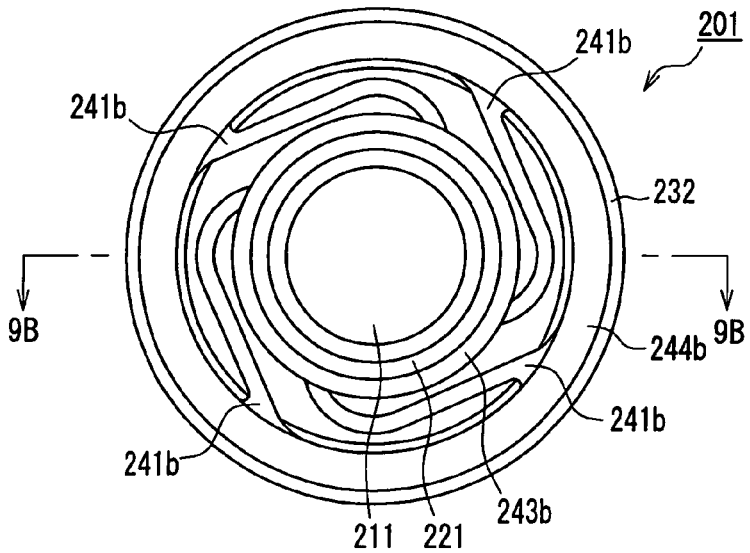
FIG. 9C is a bottom view showing the lens module according to Embodiment 2 of the present invention.

A camera module according to Embodiment 2 of the present invention will be described with reference to the drawings. FIG. 9A is a plan view showing a configuration of a lens module according to Embodiment 2 of the present invention, FIG. 9B is a sectional view showing the lens module according to Embodiment 2 of the present invention, and FIG. 9C is a bottom view showing the lens module according to Embodiment 2 of the present invention. Note here that FIG. 9B is a sectional view taken along an arrow line 9B-9B in FIGS. 9A and 9C, viewed in a direction indicated by arrows.

The camera module according to Embodiment 2 differs from the camera module according to Embodiment 1 in the configuration of a lens module. That is, the camera module according to Embodiment 2 can be obtained by modifying the camera module 100 shown in FIG. 1 so as to replace the lens module 1 with a lens module 201 of Embodiment 2. Thus, except for the lens module 201, the configuration and the operations of the camera module according to Embodiment 2 are the same as those of the camera module according to Embodiment 1 and the description thereof has been omitted.

A lens portion 210 has a lens 211 and a lens holder 212. The lens 211, which is formed of glass, plastic, or the like, serves to refract light incident thereon. The lens holder 212 is formed of plastic or the like and has a substantially cylindrical shape. The lens 211 is disposed inside the lens holder 212 by press-fitting or the like.

A movable base 220 has a movable base holder 221 and a coil portion 222. The movable base holder 221 is formed of plastic or the like and has a substantially cylindrical shape. The lens portion 210 is disposed in the upper part of the movable base holder 221 by press-fitting or the like. The coil portion 222 is composed of four coils arranged on the outer periphery of the movable base holder 221. These four coils are arranged around the central portion of the movable base holder 221 at intervals of 90° about the optical axis of the lens 211. Each of these coils is a substantially rectangular-shaped coil composed of a plurality of layers formed of a self-welding wire or the like, and is arranged so that magnetic flux is generated in the radial direction of the lens 211. The coil portion 222 is arranged at a bobbin-like portion at the outer peripheral portion of the movable base holder 221. It is to be noted here that, out of these four coils, FIG. 9B shows only coils 222a and 222c and does not show the remaining two coils.

Furthermore, as shown in FIG. 9B, it is desirable that the center of the coil portion 222 is located below the center of the lens portion 210 in the optical axis direction of the lens 211. As compared with the case where the center of the lens portion 210 coincides with the center of the coil portion 222 in the optical axis direction, such a configuration is advantageous in that the space above the lens 211 can be reduced while maintaining a proper relative distance between the lens 211 and the imaging element 4 (see FIG. 1). This allows the lens module 201 to be made thinner, thus allowing the camera module of Embodiment 2 to be made thinner.

The movable base 221 has an opening 223 at its lower part. With this configuration, it is possible to prevent incident light from scattering on a side surface of a columnar-shaped void formed inside the movable base 221. Thus, a good image can be formed on the imaging element 4 (see FIG. 1) at all times. When the center of the coil portion 222 is located below the center of the lens portion 210 in the optical axis direction of the lens 211, it is possible to arrange the lower part of the opening 223 in the vicinity of the imaging element 4 with the use of a small supporting portion 3 (see FIG. 1). This contributes to the cost reduction of the camera module.

A fixed base 230 has a permanent magnet portion 231 and a yoke 232. The permanent magnet portion 231 is composed of four permanent magnets that are arranged so as to oppose the four coils provided in a coil portion 222, respectively, and is arranged so that magnetic flux is generated in the radial direction of the lens 211. The respective permanent magnets are formed by cutting a surface-treated neodymium sintered magnet with a cylindrical shape so as to obtain four arc-shaped pieces whose central angle is slightly smaller than 90° (about 80°). Out of these permanent magnets, those magnetized so that an inner side thereof in the radial direction of the lens 211 becomes an N pole are arranged in the upper part, while those having the same shape and magnetized so that an inner side thereof in the radial direction of the lens 211 becomes an S pole are arranged in the lower part. It is to be noted here that, out of these four permanent magnets, FIG. 9B shows only the permanent magnets 231a and 231c and does not show the remaining two permanent magnets. The yoke 232 is obtained by forming a ferromagnetic material, such as iron, whose surfaces have been plated, into a cylindrical shape. The inner periphery of the yoke 232 has the same curvature as the outer peripheries of the four permanent magnets (the permanent magnet portion 231) including the permanent magnets 231a and 231c. The four permanent magnets (the permanent magnet portion 231) including the permanent magnets 231a and 231c are fixed firmly inside the yoke 232, and the yoke 232 is disposed on the upper part of the supporting portion 3 (see FIG. 1). That is, the yoke 232 is arranged so as to be connected to the outer side of the permanent magnet portion 231 in the magnetization direction.

Furthermore, each of the coils (the coils 222a and 222c and the remaining two coils) in the coil portion 222 is arranged so as to form a gap on the inner side of the permanent magnet portion 231. Thus, the yoke 232 is disposed only on the outer peripheral portion of the permanent magnet portion 231, and no yoke is disposed on the inner side of the permanent magnet portion 231. The size of the lens 211 in the radial direction can be reduced, thereby allowing the size of the voice coil motor in the radial direction to be reduced. As a result, the camera module can be made smaller. Furthermore, because the permanent magnet portion 231, the respective coils (the coil 222a and the 222c and the remaining two coils) in the coil portion 222 are arranged inside the yoke 232 and between the upper spring 241a and the lower spring 241b, the camera module can be made thinner.

A coupling portion 240 has the upper spring 241a, the lower spring 241b, an inner-side upper part stopper 243a, an inner-side lower part stopper 243b, an outer-side upper part stopper 244a, and an outer-side lower part stopper 244b. The upper spring 241a is formed of a metal that has high electrical conductivity, for example, and can be obtained by punching out a plate-like member formed of such a metal into a predetermined shape. The inner peripheral side of the upper spring 241a is connected to the upper part of the lens holder 212, and the outer peripheral side of the upper spring 241a is connected to the upper part of the magnet portion 231. The lower spring 241b has the same structure as the upper spring 241a. The inner peripheral side of the lower spring 241b is connected to the lower part of the movable base holder 221, and the outer peripheral side of the lower spring 241b is connected to the lower part of the magnet portion 231.

Furthermore, the outer peripheral side of the upper spring 241a is connected to the driving element 6 (see FIG. 1) via a wire or a metal film pattern. The outer peripheral side of the lower spring 241b is connected to the driving element 6 via a wire or a metal film pattern.

Although not shown in the drawings, the inner peripheral side of the upper spring 241a is connected electrically to one end of the winding of each of the coils (the coils 222a and 222c and the remaining two coils) in the coil portion 222. Furthermore, although not shown in the drawings, the inner peripheral side of the lower spring 241b is connected electrically to the other end of the winding of each of the coils (the coils 222a and 222c and the remaining two coils) in the coil portion 222. That is, the upper wire 242a is connected electrically to one end of each of the coils (the coils 222a and 222c and the remaining two coils) in the coil portion 222 via the upper spring 241a, and the lower wire 242b is connected electrically to the other end of each of the coils (the coils 222a and 222c and the remaining two coils) in the coil portion 222 via the lower spring 241b.

With this configuration, due to the interaction (Lorentz force) between the magnetic fluxes caused by the respective permanent magnets (the permanent magnets 231a and 231c and the remaining two permanent magnets) and the currents flowing through the respective coils (the coils 222a and 222c and the remaining two coils), an upward force or a downward force is applied to the respective coils (the coils 222a and 222c and the remaining two coils). The lens portion 210 and the movable base 220 integrally move upward until they reach a position where this force balances the force (Hooke's force) caused by the deformation of the upper spring 241a and the lower spring 241b of the coupling portion 240. Thus, the relative distance between the lens 211 and the imaging element 4 increases.

The movement amount of the lens portion 210 and the movable base 220 is proportional to the Lorentz force, the Lorentz force is proportional to the current flowing through the respective coils (the coils 222a and 222c and the remaining two coils), and the current is proportional to the voltage between the upper wire 42a and the lower wire 42b. Therefore, the controlling element 5 can control the relative distance between the lens 211 and the imaging element 4 by controlling the voltage between the upper wire 42a and the lower wire 42b using the driving element 6.

The lower spring 241b is arranged on a side closer to the imaging element 4 (see FIG. 1) with respect to the center in the optical axis direction of the lens 211 and couples the lens portion 210 and the fixed base 230. The upper spring 241a is arranged on a side opposite to the side closer to the imaging element 4 with respect to the center in the optical axis direction of the lens 211 and couples the lens portion 210 and the fixed base 3 (see FIG. 1).

More specifically, the upper spring 241a has annular portions at both inner and outer parts, and these annular portions are connected to each other with four arms. The lower spring 241b has the same structure as the upper spring 241a. The inner-side upper part stopper 243a is plastic or the like formed into an annular shape, and is disposed in the lens holder 212 by press-fitting or the like so that the inner annular portion of the upper spring 241a is held by being sandwiched between the inner-side upper part stopper 243a and the lens holder 212. The inner-side lower part stopper 243b is plastic or the like formed into an annular shape, and is disposed in the movable base holder 221 by press-fitting or the like so that the inner annular portion of the lower spring 241b is held by being sandwiched between the inner-side lower part stopper 243b and the movable base holder 221. The outer-side upper part stopper 244a is plastic or the like formed into an annular shape, and is disposed at the upper part of the inner periphery of the yoke 232 by press-fitting or the like so that the outer annular portion of the upper spring 241a is held by being sandwiched between the outer-side upper part stopper 244a and the inner periphery of the yoke 232. The outer-side lower part stopper 244b is plastic or the like formed into an annular shape, and is disposed at the lower part of the inner periphery of the yoke 232 by press-fitting or the like so that the outer annular portion of the lower spring 241b is held by being sandwiched between the outer-side lower part stopper 244b and the inner periphery of the yoke 232.

Here, the upper spring 241a and the lower spring 241b will be described with reference to, in particular, FIGS. 9A and 9C. The lower spring 241b is shaped and positioned such that, if the upper spring 241a were to be moved parallel to the optical axis direction of the lens 211 until it reached the location for the lower spring 241b and then were inverted 180° with respect to an axis indicated by the line 9B-9B that is perpendicular to the optical axis of the lens 211, the lower spring 241b would be seen. When comparing FIG. 9A with FIG. 9C, it might seem that the lower spring 241b does not correspond to the inverted upper spring 241a. However, this is because FIG. 9A is a plan view, whereas FIG. 9C is a bottom view. At the time of their assembly, the upper spring 241a and the lower spring 241b are symmetrical to each other with respect to the axis indicated by the line 9B-9B.

By configuring and positioning the two elastic bodies having the same shape (i.e., the upper spring 241a and the lower spring 241b) so that they can be considered to be inverted symmetrically relative to each other with respect to an axis perpendicular to the optical axis of the lens 211 as described above, the relative distance between the lens 211 and the imaging element 4 can be changed without causing friction. Accordingly, it is possible to provide a small and thin autofocus camera module with low power consumption. Furthermore, by configuring and positioning the upper spring 241a and the lower spring 241b so that they can be considered to be inverted symmetrically relative to each other, the occurrence of a tilt of the lens portion 20 can be suppressed so that a good image can be formed on the imaging element 4 at all times. Accordingly, it is possible to provide a camera module that can produce a high quality image.

Although the camera module of Embodiment 2 is configured so as to use four coils arranged around the optical axis of the lens 211, it may be configured so as to use two coils arranged along the optical axis of the lens 211 as in the camera module of Embodiment 1.

Between the permanent magnet portion 231 and the upper spring 241a, an upper insulating sheet formed of resin or paper may be provided. Furthermore, between the permanent magnet portion 231 and the lower spring 241b, a lower insulating sheet formed of resin or paper may be provided. The upper spring 241a thus is prevented from being in contact with the permanent magnet 231, so that they are insulated electrically from each other. Also, the lower spring 241b is prevented from being in contact with the permanent magnet 231, so that they are insulated electrically from each other.

Moreover, since the upper insulating sheet and the lower insulating sheet are thin, they do not increase the thickness of the camera module.

Embodiment 3

Figure 10:
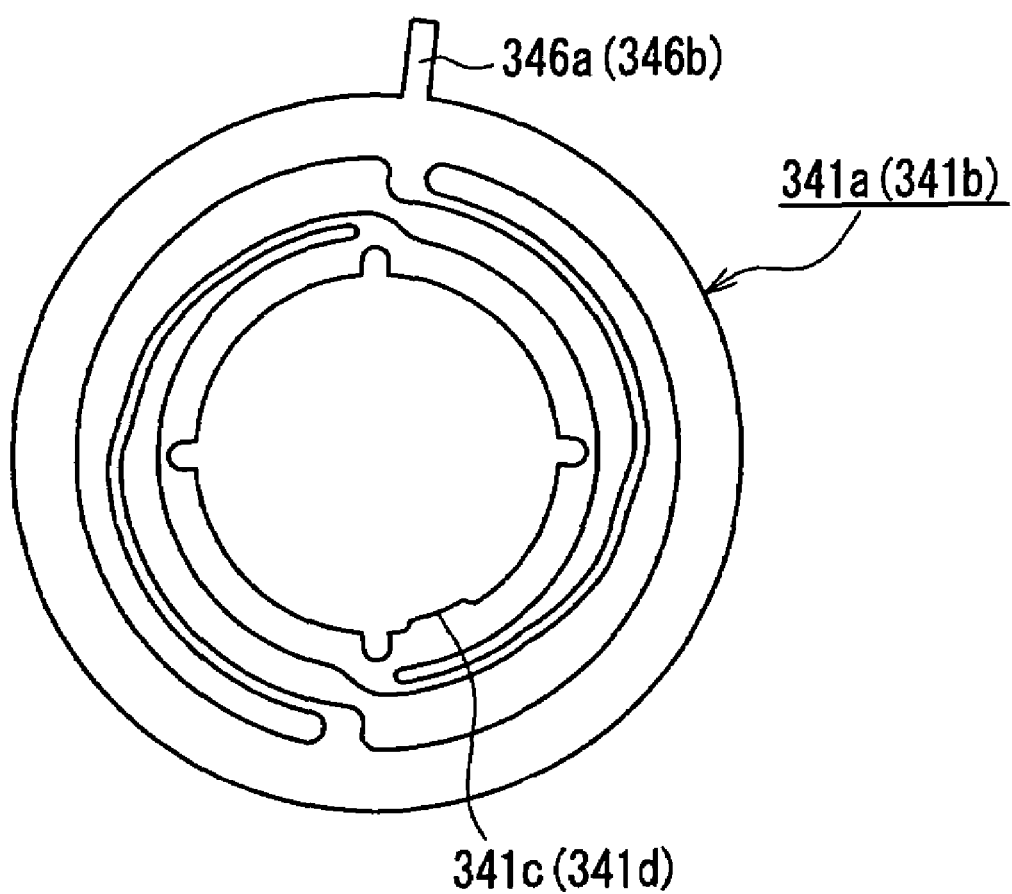
FIG. 10 is a plan view showing a configuration of an upper spring (a lower spring) of a camera module according to Embodiment 3 of the present invention.

A camera module according to Embodiment 3 of the present invention will be described with reference to the drawings. FIG. 10 is a plan view showing a configuration of an upper spring (a lower spring) of a camera module according to Embodiment 3 of the present invention.

An upper spring 341a and a lower spring 341b of the camera module according to Embodiment 3 have a different shape than the upper spring 41a and the lower spring 41b of the camera module according to Embodiment 1 shown in FIG. 7. More specifically, although the upper spring 41a and the lower spring 41b of Embodiment 1 have four arms, the upper spring 341a and the lower spring 341b of Embodiment 3 have two arms. Except for this, the camera module of Embodiment 3 has the same configuration as the camera module of Embodiment 1. That is, the camera module of Embodiment 3 can be obtained by modifying the camera module 100 shown in FIG. 1 so as to replace the upper spring 41a and the lower spring 41b with the upper spring 341a and the lower spring 341b of Embodiment 3. Accordingly, components other than the upper spring 341a and lower spring 341b, the configuration, and the operations of the camera module in Embodiment 3 are the same as those of the camera module in Embodiment 1 and the description thereof has been omitted.

The upper spring 341a is different from the upper spring 41a of Embodiment 1 only in its shape. Thus, the upper spring 341a is formed of a metal that has high electrical conductivity and is highly resistant to metal fatigue, for example, and can be obtained by punching out a plate-like member formed of such a metal into a predetermined shape with a press or the like. The upper spring 341a has annular portions at both inner and outer parts, and these annular portions are connected to each other with two arms. The lower spring 341b has the same structure as the upper spring 341a.

On the outer peripheries of the upper spring 341a and the lower spring 341b, protrusions 346a and 346b protruding outward are provided, respectively. Furthermore, when cutaway portions corresponding to the protrusions 346a and 346b are formed in the yoke 32 (see FIGS. 5A and 5C), positioning of the upper spring 341a and the lower spring 341b can be achieved easily by fitting the protrusions 346a and 346b in these cut-away portions.

One end of the winding of each of the upper coil 22a and the lower coil 22b (see FIGS. 5A and 5C) may be connected to a protrusion 341c provided on the inner annular portion of the upper spring 341a by soldering or the like. The other end of the winding of each of the upper coil 22a and the lower coil 22b may be connected to a protrusion 341d provided on the inner annular portion of the lower spring 341b by soldering or the like. This allows the upper coil 22a and the lower coil 22b to be connected electrically to each other.

These upper spring 341a and lower spring 341b are arranged in the same manner as in Embodiment 1. That is, the lower spring 341b is shaped and positioned such that, if the upper spring 341a were to be moved parallel to the optical axis direction of the lens 11 until it reached the location for the lower spring 341b and then were inverted 1800 with respect to an axis that is perpendicular to the optical axis of the lens 11, the lower spring 341b would be seen. Even when the number of arms is reduced from four to two as in each of the upper spring 341a and lower spring 341b, it is possible to obtain the same effect as in Embodiment 1.

In the case where only two arms are provided, the spring constant can be reduced as compared with the case where four arms are provided, so that the required force can be reduced. Thus, the camera module can be made still smaller and thinner and achieve still lower power consumption.

Figure 11A:
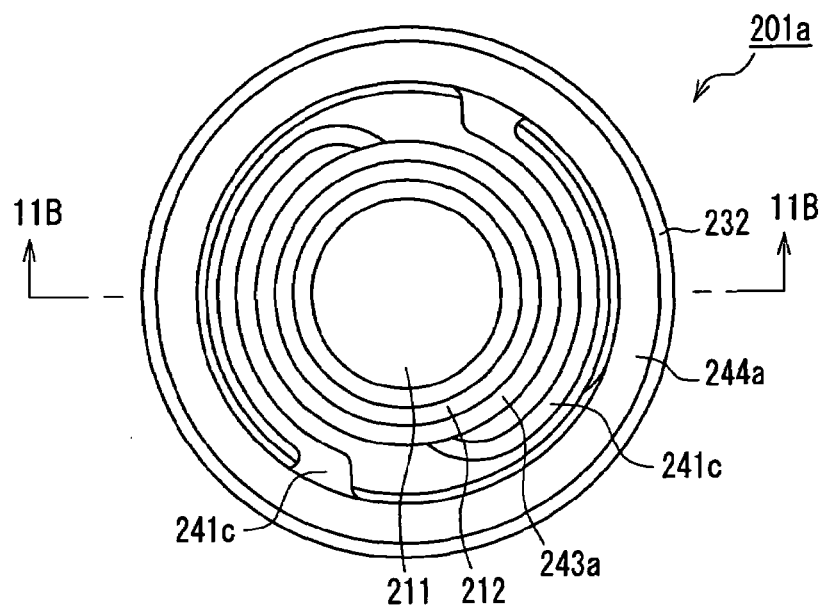
FIG. 11A is a plan view showing another configuration of the lens module according to Embodiment 3 of the present invention.
Figure 11B:
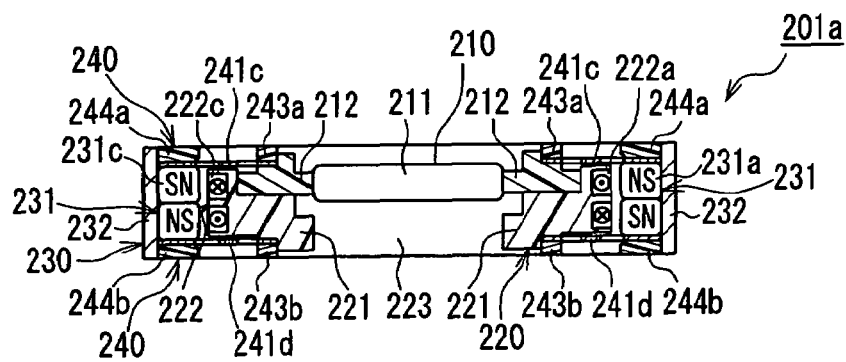
FIG. 11B is a sectional view showing the another configuration of the lens module according to Embodiment 3.
Figure 11C:
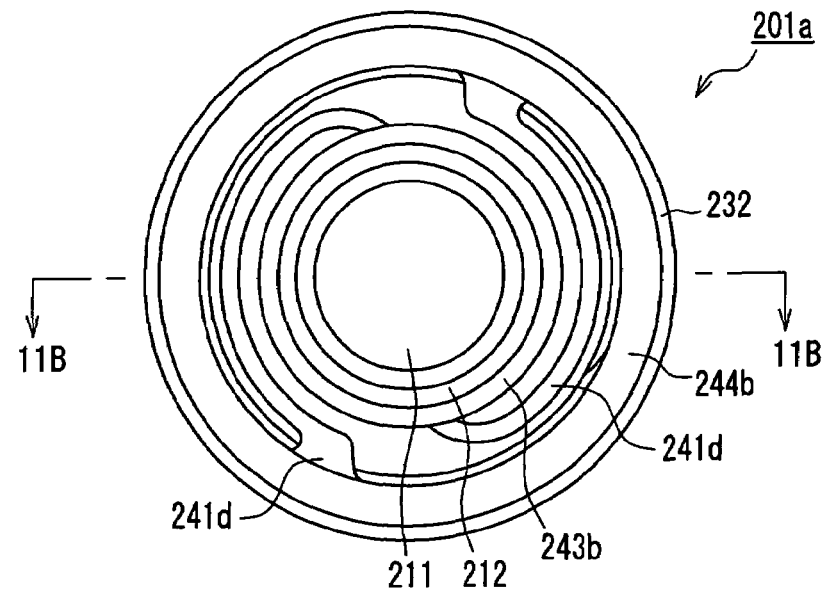
FIG. 11C is a bottom view showing the another configuration of the lens module according to Embodiment 3.

Also with regard to the upper spring 241a and the lower spring 241b in the lens module 201 of Embodiment 2 shown in FIGS. 9A, 9B, and 9C, the same effect can be obtained even when the number of arms provided therein is reduced from four to two. The camera module with such a configuration will be described below. FIG. 11A is a plan view showing another configuration of the lens module according to Embodiment 3 of the present invention, FIG. 11B is a sectional view showing the another configuration of the lens module according to Embodiment 3, and FIG. 11C is a bottom view showing the another configuration of the lens module according to Embodiment 3. Note here that FIG. 11B is a sectional view taken along an arrow line 11B-11B in FIGS. 11A and 11C, viewed in a direction indicated by arrows. Also note that the lens module 201a shown in FIGS. 11A, 11B, and 11C has the same configuration as the lens module 201 shown in FIGS. 9A, 9B, and 9C, except for the shape of the upper spring and the lower spring. Therefore, components other than the upper spring and the lower spring are given the same reference numerals and the description thereof has been omitted. As shown in FIGS. 11A, 11B, and 11C, the upper spring 241c has annular portions at both inner and outer parts, and these annular portions are connected to each other with two arms. The lower spring 241d has the same structure as the upper spring 241c.

These upper spring 241c and lower spring 241d are arranged in the same manner as in Embodiment 2. That is, the lower spring 241d is shaped and positioned such that, if the upper spring 241c were to be moved parallel to the optical axis direction of the lens 211 until it reached the location for the lower spring 241d and then were inverted 180° with respect to an axis that is perpendicular to the optical axis of the lens 211, the lower spring 241d would be seen. Even when the number of arms is reduced from four to two in each of the upper spring 241c and the lower spring 241d, it is possible to obtain the same effect as in Embodiment 2.

In the case where only two arms are provided, the spring constant can be reduced as compared with the case where four arms are provided, so that the required force can be reduced. Thus, the camera module can be made still smaller and thinner and achieve still lower power consumption.

Embodiment 4

A camera module according to Embodiment 4 of the present invention will be described with reference to the drawings. The camera module of Embodiment 4 has substantially the same configuration as the camera module of Embodiment 1. The camera module of Embodiment 4 is different from that of Embodiment 1 only in the arrangement of an upper spring 41a and a lower spring 41b. More specifically, in the camera module of Embodiment 4, the upper spring 41a and the lower spring 41b are arranged so as to have a phase shift while sharing a common central axis. That is, the upper spring 41a and the lower spring 41b have the same shape and are arranged so as to have a phase shift rather than to be symmetrical to each other. Components other than the upper spring 41a and the lower spring 41b, the configuration, and the operations of the camera module in Embodiment 4 are the same as those of the camera module in Embodiment 1 and the description thereof has been omitted.

Figure 12:
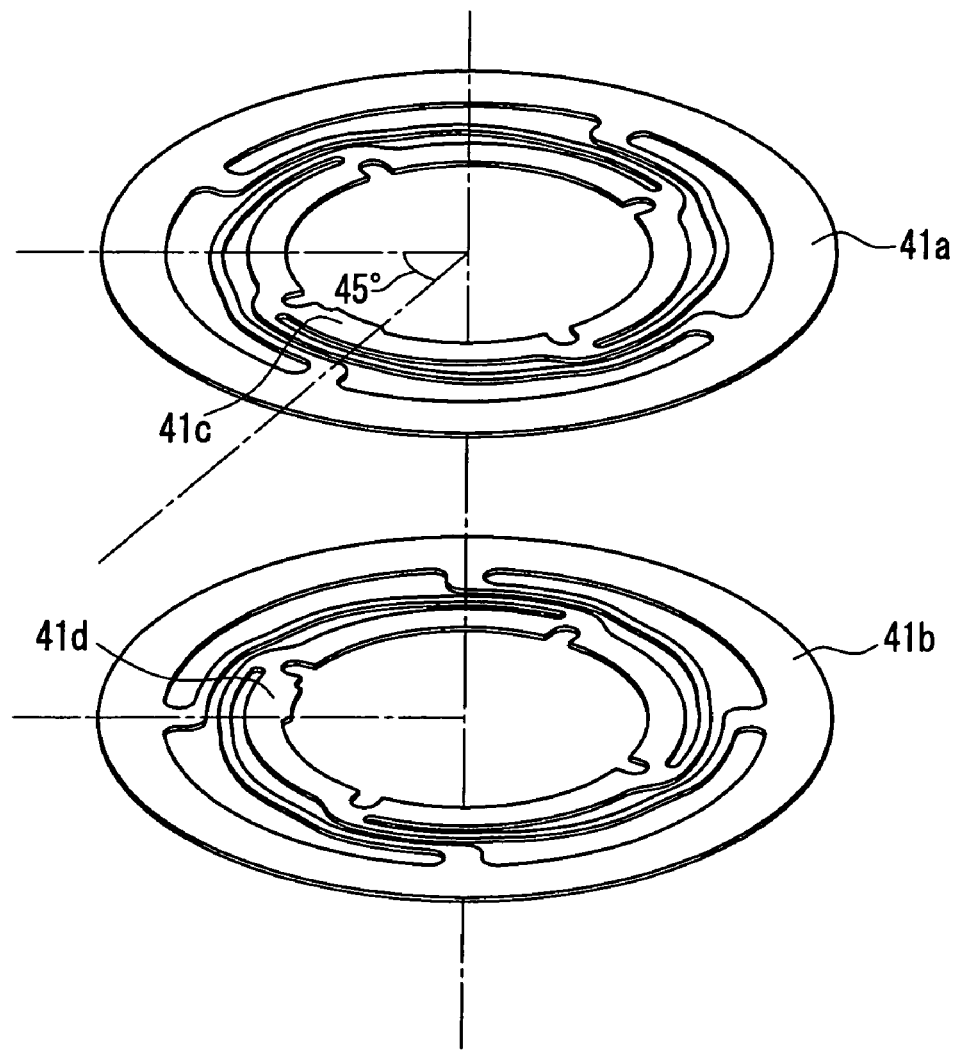
FIG. 12 is a perspective view showing an arrangement of an upper spring and a lower spring according to Embodiment 4 of the present invention.

FIG. 12 is a perspective view showing an arrangement of the upper spring and the lower spring according to Embodiment 4 of the present invention. Embodiment 4 will be described with reference to FIGS. 5A, 5B and 5C showing the lens module of Embodiment 1 and FIG. 8 showing the arrangement of the upper spring and the lower spring in Embodiment 1.

FIG. 12 is a view corresponding to FIG. 8. Note here that, in the upper spring 41a and the lower spring 41b shown in FIG. 12, protrusions 46a and 46b provided in the upper spring 41a and the lower spring 41b shown in FIG. 8 are omitted. In FIG. 8, the lower spring 41b is shaped and positioned such that, if the upper spring 41a were to be moved parallel to the optical axis direction of the lens 11 until it reached the location for the lower spring 41b and then were inverted 180° with respect to an axis that is perpendicular to the optical axis of the lens 11, the lower spring 41b would be seen. In contrast, in Embodiment 4 shown in FIG. 12, the lower spring 41b is shaped and positioned such that, if the upper spring 41a were to be moved parallel to the optical axis direction of the lens 11 until it reached the location for the lower spring 41b and then were rotated 45° about the optical axis of the lens 11, the lower spring 41b would be seen.

By arranging two elastic bodies having the same shape (i.e., the upper spring 41a and the lower spring 41b) so as to have a phase shift while sharing a common central axis as described above, the relative distance between the lens 11 and the imaging element 4 (see FIG. 1) can be changed without causing friction, as in Embodiment 1. Accordingly, it is possible to provide a small and thin camera module with a focus control function, achieving low power consumption. Furthermore, since there is a phase shift between the upper spring 41a and the lower spring 41b, the occurrence of a tilt of the lens portion 10 can be suppressed. Accordingly, it is possible to provide a camera module in which a good image can be formed on the imaging element 4 (see FIG. 1) at all times.

It is preferable that the amount of the phase shift is $(180/N)°$ where N denotes the number of arms provided in the upper spring 41a and the lower spring 41b. Under this condition, the phase shift between the upper spring 41a and the lower spring 41b is at its maximum, so that the camera module can be well balanced and minimizes the tilt. Since N is 4 in Embodiment 4, the amount of the phase shift is set to 45°. This allows a good image to be formed on the imaging element 4 (see FIG. 1) at all times. Accordingly, it is possible to provide a high-performance camera module.

Embodiment 5

Figure 13A:
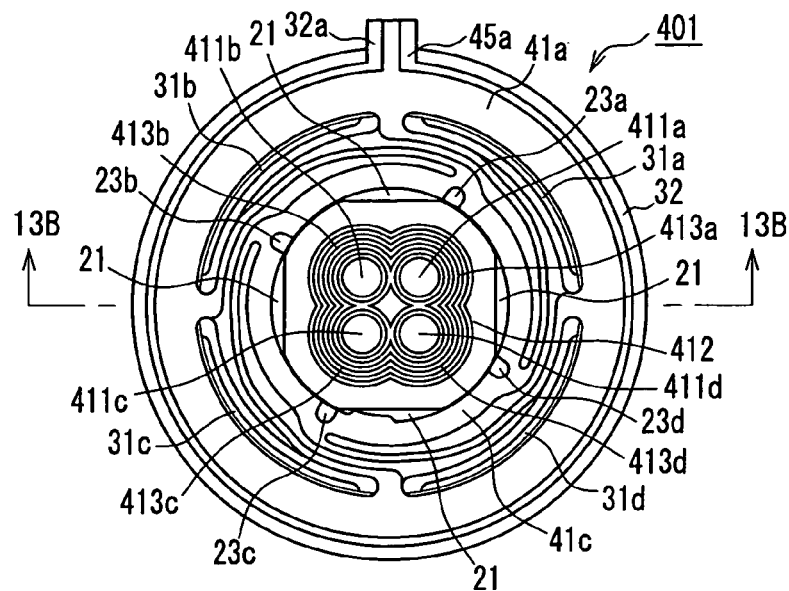
FIG. 13A is a plan view showing a configuration of a lens module according to Embodiment 5 of the present invention.
Figure 13B:
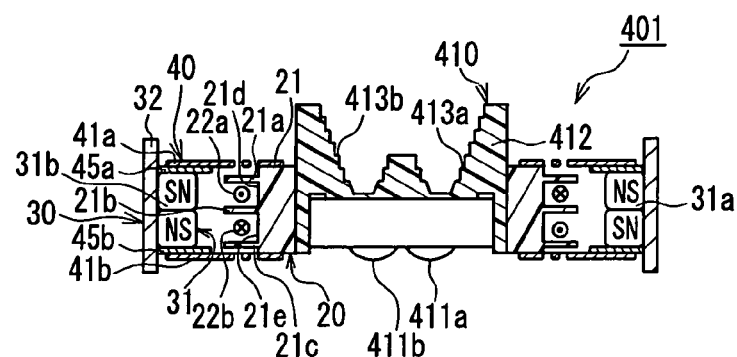
FIG. 13B is a sectional view showing the lens module according to Embodiment 5 of the present invention.
Figure 13C:
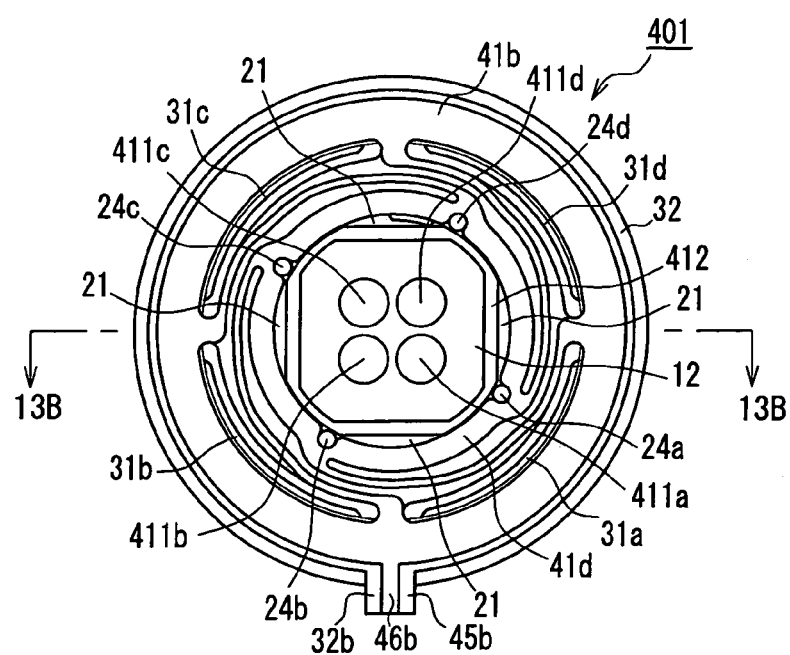
FIG. 13C is a bottom view showing the lens module according to Embodiment 5 of the present invention.

A camera module according to Embodiment 5 of the present invention will be described with reference to the drawings. FIG. 13A is a plan view showing a configuration of a lens module according to Embodiment 5 of the present invention, FIG. 13B is a sectional view showing the lens module according to Embodiment 5 of the present invention, and FIG. 13C is a bottom view showing the lens module according to Embodiment 5 of the present invention. Note here that FIG. 13B is a sectional view taken along an arrow line 13B-13B in FIGS. 13A and 13C, viewed in a direction indicated by arrows.

The camera module of Embodiment 5 is different from the camera module of Embodiment 1 in the configuration of a lens module. That is, the camera module of Embodiment 5 can be obtained by modifying the camera module 100 shown in FIG. 1 so as to replace the lens module 1 with a lens module 401 of Embodiment 5. Thus, except for the lens module 401, the configuration and the operations of the camera module of Embodiment 5 are the same as those of the camera module of Embodiment 1 and the description thereof has been omitted.

The lens module 401 of Embodiment 5 has the same configuration as the lens module of Embodiment 1, except that the lens module 401 has four lenses. Therefore, in FIGS. 13A, 13B, and 13C, components having the same function as those in the lens module 1 of Embodiment 1 shown in FIGS. 5A, 5B, and 5C are given the same reference numerals and the description thereof has been omitted.

As shown in FIGS. 13A, 13B, and 13C, the lens module 401 of Embodiment 5 has a lens portion 410, a movable base 20, a fixed base 30, and a coupling portion 40.

The lens portion 410 has a lens including four lenses 411a, 411b, 411c and 411d and a lens holder 412. The lenses 411a, 411b, 411c, and 411d all have the same shape. They are formed of glass, plastic, or the like, and serve to refract light incident thereon. The lenses 411a, 411b, 411c, and 411d are formed of glass or resin having a high refractive index and low dispersibility, for example. Such glass or resin may be formed into a substantially rectangular shape in which substantially the same four curved surfaces are provided on both the upper surface and the lower surface by injection molding or cutting. The lens holder 412 is formed of resin or the like. In the lens holder 412, four tapered holes 413a, 413b, 413c, and 413d are formed at intervals of 90° about the center of the lens holder 412. The four holes arranged at intervals of 90° are arranged so that their centers coincide with the optical axes of the lenses 411a, 411b, 411c, and 411d, respectively. In other words, the lenses 411a, 411b, 411c, and 411d are arranged with a phase shift of 90° about the center of the lens holder 412. While FIGS. 13A, 13B, and 13C illustrate an example where the four tapered holes 413a, 413b, 413c, and 413d partially overlap each other, they may be arranged so as not to overlap each other.

The four lenses 411a, 411b, 411c, and 411d are arranged so that the center of their optical axes substantially coincides with the center of the light-receiving surface of the imaging element 4 (see FIG. 1). With this configuration, four subject images are formed on the light-receiving surface of the imaging element 4 by the four lenses 411a, 411b, 411c, and 411d. The controlling element 5 (see FIG. 1) reads in an electric signal from the imaging element 4 and converts the electric signal into a digital value. Thereafter, the controlling element 5 cuts out a region corresponding to each of the lenses 411a, 411b, 411c, and 411d and performs image processing as appropriate.

The camera module according to Embodiment 5 can perform, for example, length measurement by stereo vision, in addition to the processing achieved by a camera module provided with a single lens. Moreover, although the camera module according to Embodiment 5 is configured so that the controlling element 5 cuts out a region using a single imaging element 4, it may be configured so as to perform this operation using four imaging elements. More specifically, four imaging elements are arranged so that the centers of the optical axes of the lenses 411a, 411b, 411c, and 411d substantially coincide with the centers of light-receiving surfaces of the respective imaging elements. The subject images formed by the lenses 411a, 411b, 411c, and 411d may be received by the respective imaging elements.

Furthermore, the camera module of Embodiment 5 has two elastic bodies having the same shape (i.e., the upper spring 41a and the lower spring 41b). These are configured and positioned such that they can be considered to be inverted symmetrically relative to each other with respect to an axis perpendicular to the optical axes of the lenses 411a, 411b, 411c, and 411d. With this configuration, the camera module of the present embodiment produces the same effect as that of the camera module of Embodiment 1. That is, the relative distance between the lenses 411a, 411b, 411c, and 411d and the imaging element 4 can be changed without causing friction. Accordingly, it is possible to provide an autofocus camera module that can be made smaller and thinner and can achieve a reduction in power consumption. Furthermore, the occurrence of a tilt of the lens portion 10 can be suppressed, so that a good image can be formed on the light-receiving surface of the imaging element 4 at all times. Accordingly, it is possible to provide a camera module that can produce a good image. In particular, since the occurrence of the tilt is suppressed, distortion of the coordinates of the subject images formed by the respective lenses 411a, 411b, 411c, and 411d can be suppressed. Therefore, the length measurement by the stereo vision can be achieved with high accuracy. Moreover, since the rotation of the lens portion 410 also can be suppressed, the rotation of the coordinates of the subject images formed by the respective lenses 411a, 411b, 411c, and 411d can be suppressed. Therefore, the length measurement by the stereo vision can be achieved with high accuracy.

Although the upper spring 41a and the lower spring 41b are arranged as shown in FIG. 8, they may be arranged as shown in FIG. 12 as described in Embodiment 4. This allows the tilt to be minimized, so that a good image can be formed on the imaging element 4 (see FIG. 1) at all times. Accordingly, it is possible to provide a high-performance camera module.

Furthermore, the upper spring 341a and the lower spring 341b having two arms as shown in FIG. 10 also can be used.

Embodiment 6

Figure 14A:
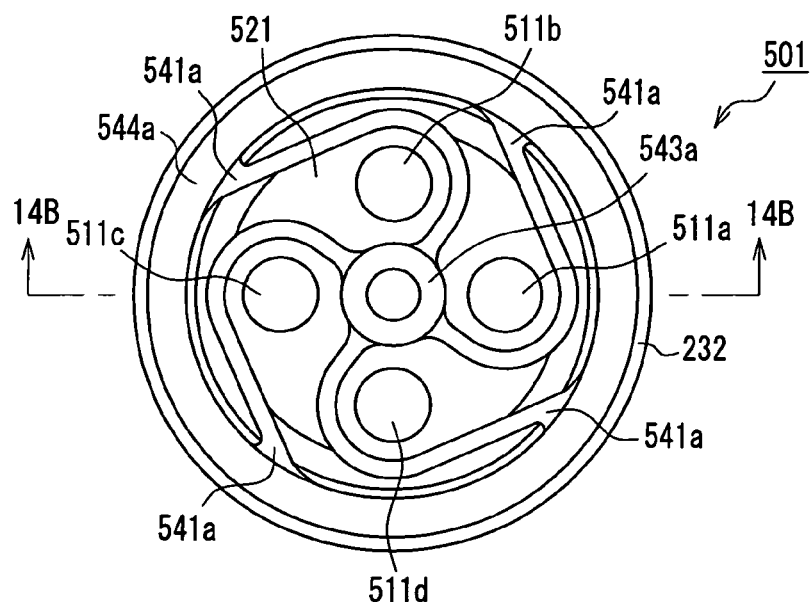
FIG. 14A is a plan view showing a configuration of a lens module according to Embodiment 6 of the present invention.
Figure 14B:
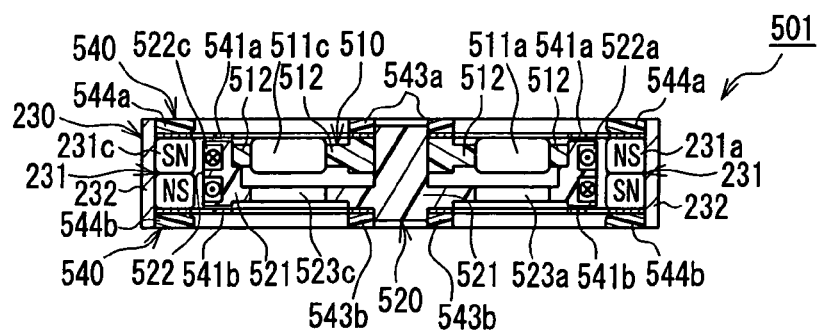
FIG. 14B is a sectional view showing the lens module according to Embodiment 6 of the present invention.
Figure 14C:
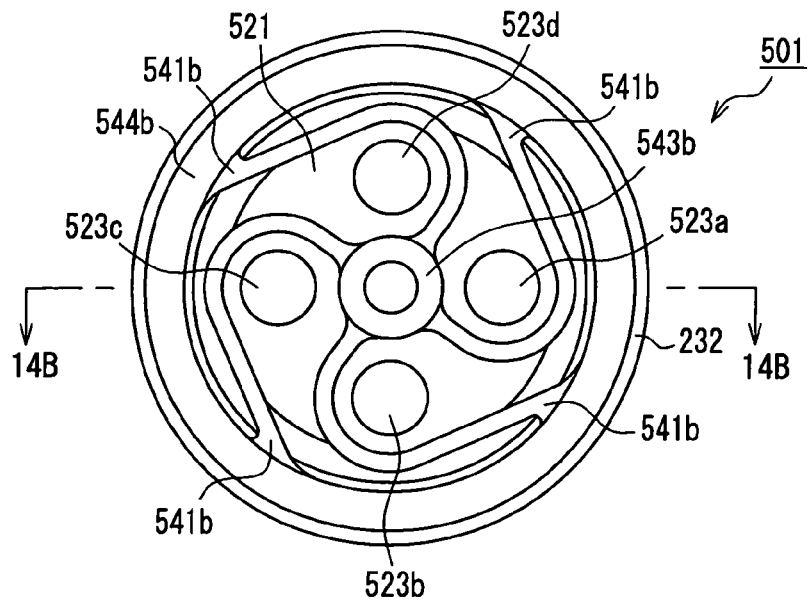
FIG. 14C is a bottom view showing the lens module according to Embodiment 6 of the present invention.

A camera module according to Embodiment 6 of the present invention will be described with reference to the drawings. FIG. 14A is a plan view showing a configuration of a lens module according to Embodiment 6 of the present invention, FIG. 14B is a sectional view showing the lens module according to Embodiment 6 of the present invention, and FIG. 14C is a bottom view showing the lens module according to Embodiment 6 of the present invention. Note here that FIG. 14B is a sectional view taken along an arrow line 14B-14B in FIGS. 14A and 14C, viewed in a direction indicated by arrows.

The camera module of Embodiment 6 can be obtained by modifying the camera module 100 shown in FIG. 1 so as to replace the lens module 1 with a lens module 501 of Embodiment 6. Thus, except for the lens module 501, the configuration and the operations of the camera module of Embodiment 6 are the same as those of the camera module of Embodiment 1 and the description thereof has been omitted. Note here that, in the lens module of Embodiment 6 shown in FIGS. 14A, 14B, and 14C, components having the same function as those in the lens module 201 of Embodiment 2 shown in FIGS. 9A, 9B, and 9C are given the same reference numerals and the description thereof has been omitted.

As shown in FIG. 14B, the lens module 501 of Embodiment 6 has a lens portion 510, a movable base 520, a fixed base 230, and a coupling portion 540.

The lens portion 510 has four lenses 511a, 511b, 511c, and 511d and a lens holder 512. The lenses 511a, 511b, 511c, and 511d all have the same shape. They are formed of glass, resin, or the like having a high refractive index and low dispersibility and serve to refract light incident thereon. The lenses 511a, 511b, 511c, and 511d can be produced by shaping glass, resin, or the like by injection molding or cutting. The lens holder 512 is formed of resin or the like and has a substantially disk shape. A hole is formed at the central portion of the lens holder 512, and four holes further are formed at intervals of 90° about the center of the disk. In these four holes formed at intervals of 90°, the lenses 511a, 511b, 511c, and 511d are disposed, respectively, by press-fitting or the like. That is, the lenses 511a, 511b, 511c, and 511d are arranged with a phase shift of 90° about the center of the lens holder 512.

The movable base 520 has a movable base holder 521 and a coil portion 522. The movable base holder 521 is resin or the like formed into a substantially disk shape, and has protrusions protruding upward and downward at its central portion. Openings 523a, 523b, 523c and 523d are formed at intervals of 90°, and the lens portion 510 is disposed in the upper part of the movable base holder 521. In the hole provided at the central portion of the lens holder 512 of the lens portion 510, the protrusion protruding upward provided at the central portion of the movable base holder 521 is press-fitted. Thus, the lens portion 510 is fixed to the movable base holder 521. The centers of the lenses 511a, 511b, 511c, and 511d in the optical axis direction coincide with the centers of the openings 523a, 523b, 523c, and 523d, respectively. Furthermore, the sizes of the lenses 511a, 511b, 511c, and 511d coincide with the sizes of the openings 523a, 523b, 523c, and 523d, respectively. The coil portion 522 is composed of four coils arranged on the outer periphery of the movable base holder 521 at intervals of 90°. Each of these coils is a substantially rectangular-shaped coil composed of a plurality of layers formed of a self-welding wire or the like, and are arranged so that magnetic flux is generated in the radial direction of the lens holder 512. The coil portion 522 is arranged at a bobbin-like portion at the outer peripheral portion of the movable base holder 521. It is to be noted here that, out of these four coils, FIG. 14B shows only coils 522a and 522c and does not show the remaining two coils.

Furthermore, as shown in FIG. 14A, it is desirable that the center of the coil portion 522 is located below the center of the lens portion 510 in the optical axis direction of the lenses 511a, 511b, 511c, and 511d. As compared with the case where the center of the lens portion 510 coincides with the center of the coil portion 522 in the optical axis direction, such a configuration is advantageous in that the space above the lenses 511a, 511b, 511c, and 511d can be reduced while maintaining a proper relative distance between the lenses 511a, 511b, 511c, and 511d and the imaging element 4 (see FIG. 1). This allows the lens module 501 to be made thinner, thus allowing the camera module of Embodiment 6 to be made thinner.

The fixed base 230 is the same as that used in Embodiment 2, and the description thereof thus has been omitted.

The coupling portion 540 has the upper spring 541a, the lower spring 541b, an inner-side upper part stopper 543a, an inner-side lower part stopper 543b, an outer-side upper part stopper 544a, and an outer-side lower part stopper 544b. The upper spring 541a and the lower spring 541b are formed of a metal that has high electrical conductivity and is highly resistant to metal fatigue, such as a beryllium copper alloy, and can be obtained by punching out a plate-like member formed of such a metal into a predetermined shape with a press or the like. The lower spring 541b is arranged on a side closer to the imaging element 4 (see FIG. 1) with respect to the center in the optical axis direction of the lenses 511a, 511b, 511c, and 511d and couples the lens portion 510 and the fixed base 230. The upper spring 541a is arranged on a side opposite to the side closer to the imaging element 4 with respect to the center in the optical axis direction of the lenses 511a, 511b, 511c, and 511d and couples the lens portion 510 and the fixed base 230.

Figure 15:
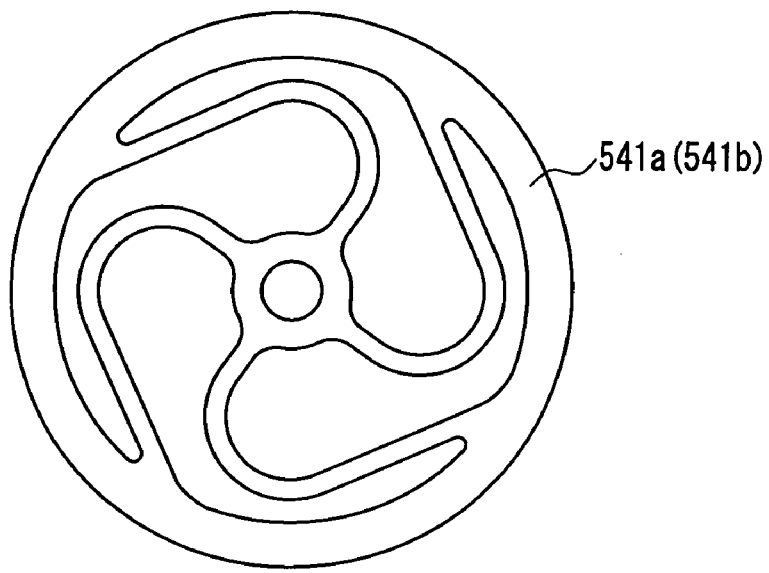
FIG. 15 is a plan view showing a configuration of an upper spring (a lower spring) according to Embodiment 6.

FIG. 15 is a plan view showing a configuration of an upper spring (a lower spring) according to Embodiment 6. More specifically, as shown in FIG. 15, the upper spring 541a has annular portions at both inner and outer parts, and these annular portions are connected to each other with four arms. The lower spring 541b has the same structure as the upper spring 541a. The inner-side upper part stopper 543a is resin formed into an annular shape by, for example, injection molding, and is disposed in the protrusion protruding upward provided at the central portion of the movable base holder 521 by press-fitting or the like so that the inner annular portion of the upper spring 541a is held by being sandwiched between the inner-side upper part stopper 543a and the protrusion. The inner-side lower part stopper 543b is resin formed into an annular shape by, for example, injection molding, and is disposed in the protrusion protruding downward provided at the central portion of the movable base holder 521 by press-fitting or the like so that the inner annular portion of the lower spring 541b is held by being sandwiched between the inner-side lower part stopper 543b and the protrusion. The outer-side upper part stopper 544a is resin or the like formed into an annular shape, and is disposed at the upper part of the inner periphery of the yoke 232 by press-fitting or the like so that the outer annular portion of the upper spring 541a is held by being sandwiched between the outer-side upper part stopper 544a and the inner periphery of the yoke 232. The outer-side lower part stopper 544b is resin formed into an annular shape by, for example, injection molding, and is disposed at the lower part of the inner periphery of the yoke 232 by press-fitting or the like so that the outer annular portion of the lower spring 541b is held by being sandwiched between the outer-side lower part stopper 544b and the inner periphery of the yoke 232.

The outer annular portion on one end of the arm portion of the upper spring 541a is supported by the fixed base 230 with the use of the outer-side upper part stopper 544a. The other end of the arm portion of the upper spring 541a is supported by the protrusion provided at the central portion of the movable base holder 521, which is located at the center of the lens portion 510, with the use of the inner-side upper part stopper 543a. For example, when the side surface of the lens portion 510 is supported, a space for this purpose needs to be provided in the radial direction of the lens module 501. However, when the arm portion is supported by the protrusion provided at the central portion of the movable base holder 521 as described above, such a space it not necessary. This prevents the camera module from extending in the radial direction of the lens module 501, thus allowing the camera module to be made smaller. It is to be noted that, with regard to the arm of the lower spring 541b, one end thereof is supported by the fixed base 230 and the other end thereof is supported by the protrusion provided at the central portion of the movable base holder 521, which is located at the center of the lens portion 510, as in the case of the arm of the upper spring 541a. Thus, it is possible to make the camera module smaller. In particular, in the length measurement by stereo vision, the distance between adjacent lenses needs to be longer in order to achieve more accurate length measurement. This, however, produces wasted space between the adjacent lenses. In such a case, supporting in the above-described manner also is advantageous.

Moreover, since the upper spring 541a and the lower spring 541b are supported at the central portion of the lens portion 510, it is possible to increase the length of the arm accordingly. The spring constant of the upper spring 541a and the lower spring 541b thus can be made smaller, so that the required force can be reduced. Thus, the force generated by the voice coil motor can be reduced accordingly, so that components such as the permanent magnet portion 231 can be made smaller. Accordingly, it is possible to provide a till smaller and thinner camera module with a focus control function, achieving still lower power consumption.

Here, the arrangement of the upper spring 541a and the lower spring 541b will be described with reference to, in particular, FIGS. 14A and 14C. The lower spring 541b is shaped and positioned such that, if the upper spring 541a were to be moved parallel to the optical axis direction of the lenses 511a, 511b, 511c, and 511d until it reached the location for the lower spring 541b and then were inverted 180° with respect to an axis indicated by the line 14B-14B that is perpendicular to the optical axis of the lenses 511a, 511b, 511c, and 511d, the lower spring 541b would be seen.

With this configuration, the camera module of the present embodiment produces the same effect as that of the camera module of Embodiment 1.

In the lens module 501 according to Embodiment 6, the four lenses 511a, 511b, 511c, and 511d are arranged so that the centers of their optical axes substantially coincide with the center of the light-receiving surface of the imaging element 4 (see FIG. 1). With this configuration, four subject images are formed on the light-receiving surface of the imaging element 4 by the four lenses 511a, 511b, 511c, and 511d. The controlling element 5 (see FIG. 1) reads in an electric signal from the imaging element 4 and converts the electric signal into a digital value. Thereafter, the controlling element 5 cuts out a region corresponding to each of the lenses 511a, 511b, 511c, and 511d and performs image processing as appropriate.

The camera module according to Embodiment 6 can perform, for example, length measurement by stereo vision, in addition to the processing achieved by a camera module provided with a single lens. Moreover, although the camera module according to Embodiment 6 is configured so that the controlling element 5 cuts out a region using a single imaging element 4, it may be configured so as to perform this operation using four imaging elements. More specifically, four imaging elements are arranged so that the optical axes of the lenses 511a, 511b, 511c, and 511d substantially coincide with the centers of light-receiving surfaces of the respective imaging elements. The subject images formed by the lenses 511a, 511b, 511c, and 511d may be received by the respective imaging elements. With this configuration, the camera module of the present embodiment produces the same effect as that of the camera module of Embodiment 5.

Although Embodiment 6 is directed to an example where the centers of the lenses 511a, 511b, 511c, and 511d coincide with the centers of the coils (the coils 522a and 522c and the remaining two coils) in the coil portion 522, respectively, in the radial direction of the movable base holder 521, the camera module of the Embodiment 6 may be configured so that the centers of the lenses 511a, 511b, 511c, and 511d do not coincide with the centers of the coils in the coil portion 522. For example, the lenses and the coils may be arranged alternately so that their centers are arranged at intervals of 45°. With this configuration, it becomes possible to provide the coils (the coils 522a and 522c and the remaining two coils) in the coil portion 522 and the permanent magnet portion 231 in the respective spaces between the lenses 511a, 511b, 511c, and 511d. In other words, the coils (the coils 522a and 522c and the remaining two coils) and the permanent magnet portion 231 may be provided further inside the camera module.

The size of the lens module 501 in the radial direction thus can be reduced, thereby allowing the camera module to be smaller.

As described above, in the camera module of Embodiment 5, the relative distance between the lenses 511a, 511b, 511c, and 511d and the imaging element 4 (see FIG. 1) can be changed without causing friction. Thus, it is possible to provide a small and thin autofocus camera module with low power consumption.

In the lens module according to Embodiment 6, it is desirable that the number of arms provided in the upper spring 541a and the lower spring 541b is the same as the number of lenses. More specifically, the upper spring 541a and the lower spring 541b have four arms, and thus four lenses, namely, the lenses 511a, 511b, 511c, and 511d, are provided. With this configuration, it is possible to arrange the upper spring 541a and the lower spring 541b so that the arms do not block light incident on the lenses 511a, 511b, 511c, and 511d. Effective use of the space thus becomes possible, so that the camera module can be made thinner.

It is to be noted that, although the camera module of Embodiment 6 has the upper spring 541a and the lower spring 541b, it may be configured so as to have the upper spring 541a alone or the lower spring 541b alone, for example. Also in this case, the upper spring 541a or the lower spring 541b may be configured so that, on the outer side thereof, the outer annular portion is supported by the fixed base 230, and on the inner side thereof, they are supported at the central position of the lens portion 510.

Between the permanent magnet portion 231 and the upper spring 541a, an upper insulating sheet formed of resin or paper may be provided. Furthermore, between the permanent magnet portion 231 and the lower spring 541b, a lower insulating sheet formed of resin or paper may be provided. The upper spring 541a thus is prevented from being in contact with the permanent magnet 231, so that they are insulated electrically from each other. Also, the lower spring 541b is prevented from being in contact with the permanent magnet 231, so that they are insulated electrically from each other. Moreover, since the upper insulating sheet and the lower insulating sheet are thin, they do not increase the thickness of the camera module.

Figure 16:
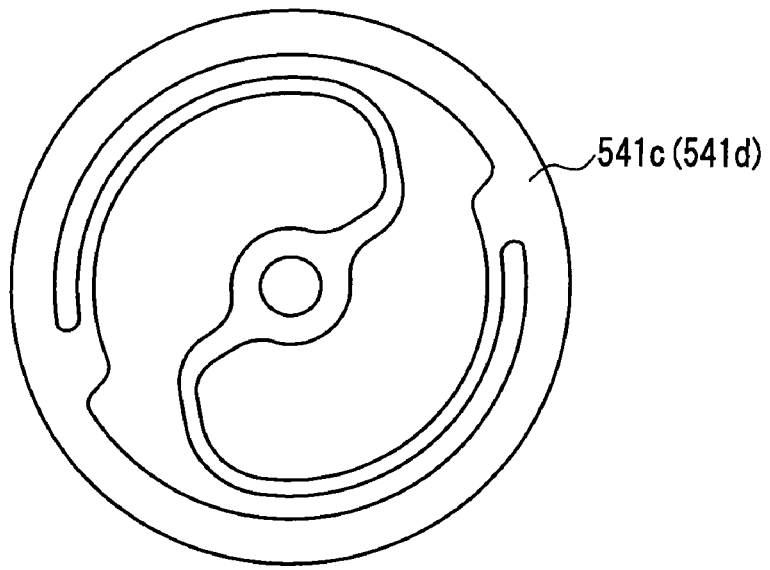
FIG. 16 is a plan view showing another configuration of the upper spring (the lower spring) according to Embodiment 6 of the present invention.

The upper spring and the lower spring may have a shape other than that of the upper spring 541a and the lower spring 541b used in Embodiment 6. FIG. 16 is a plan view showing a configuration of another upper spring (lower spring) according to Embodiment 6 of the present invention. For example, instead of the upper spring 541a and the lower spring 541b, the upper spring 541c as shown in FIG. 16 and the lower spring 541d having the same shape as the upper spring 541c may be used. The upper spring 541c has annular portions at both inner and outer parts, and these annular portions are connected to each other with two arms. When using the upper spring 541c, the lower spring 541d having the same shape as the upper spring 541c is used instead of the lower spring 541b. In the case where only two arms are provided, the spring constant can be reduced as compared with the case where four arms are provided. The required force thus can be reduced, so that the thrust required for changing the relative distance between the lens 511 and the imaging element 4 can be reduced. Therefore, the force generated by the voice coil motor can be reduced accordingly, so that components such as the permanent magnet portion 231 can be made smaller, thereby allowing a small and thin camera module to be realized. Furthermore, since the required current may be small, it is possible to realize a camera module with low power consumption.

Although the camera module of Embodiment 6 is configured so as to use four coils arranged around the optical axis, it may be configured so as to use two coils arranged along the optical axis as in the camera module of Embodiment 1.

Embodiment 7

Figure 17A:
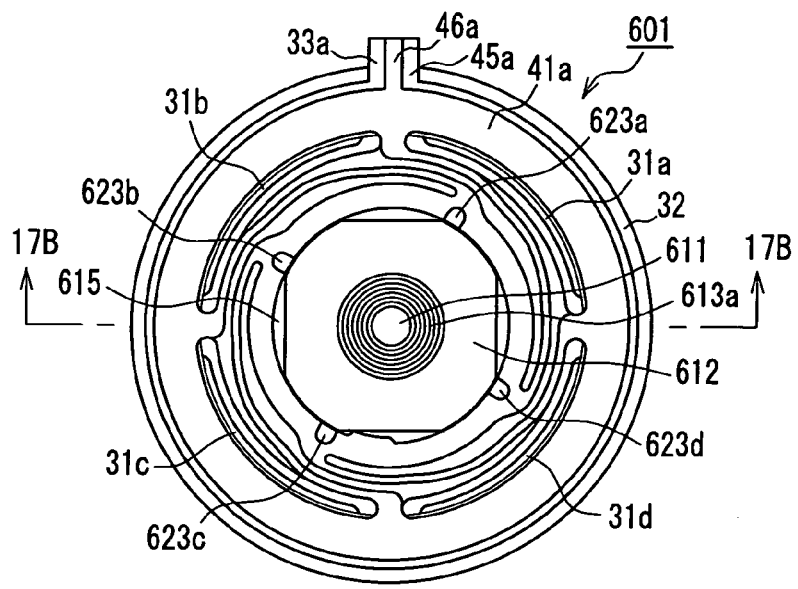
FIG. 17A is a plan view showing a configuration of a lens module according to Embodiment 7 of the present invention.
Figure 17B:
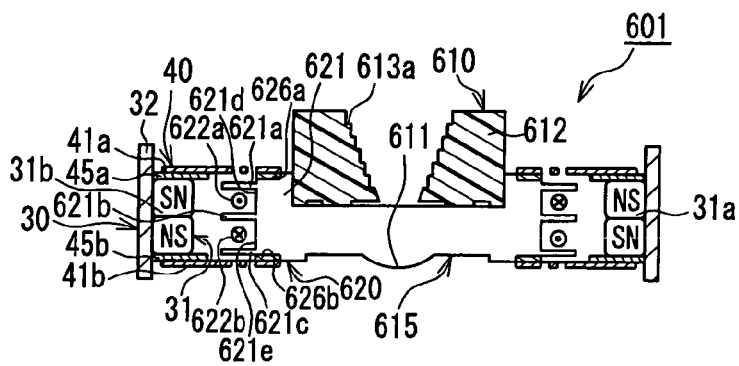
FIG. 17B is a sectional view showing the lens module according to Embodiment 7 of the present invention.
Figure 17C:
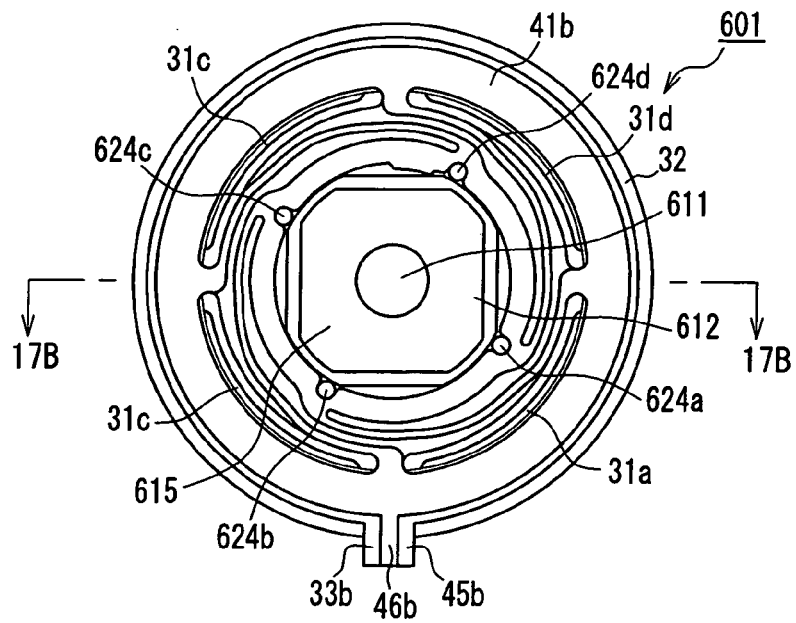
FIG. 17C is a bottom view showing the lens module according to Embodiment 7 of the present invention.

A camera module according to Embodiment 7 of the present invention will be described with reference to the drawings. FIG. 17A is a plan view showing a configuration of a lens module according to Embodiment 7 of the present invention, FIG. 17B is a sectional view showing the lens module according to Embodiment 7 of the present invention, and FIG. 17C is a bottom view showing the lens module according to Embodiment 7 of the present invention. Note here that FIG. 17B is a sectional view taken along an arrow line 17B-17B in FIGS. 17A and 17C, viewed in a direction indicated by arrows.

The camera module according to Embodiment 7 has substantially the same configuration as the camera module according to Embodiment 1, except for the configuration of the lens module. That is, the camera module of Embodiment 7 can be obtained by modifying the camera module 100 shown in FIG. 1 so as to replace the lens module 1 with a lens module 601 of Embodiment 7. Thus, except for the lens module 601, the configuration and the operations of the camera module of Embodiment 7 are the same as those of the camera module of Embodiment 1 and the description thereof has been omitted.

The lens module 601 of Embodiment 7 is configured so that a lens and a movable base holder are formed integrally. That is, coils are provided on the outer periphery of the lens. Except for this, the lens module 601 of Embodiment 7 has substantially the same configuration as the lens module of Embodiment 1. Therefore, in FIGS. 17A, 17B, and 17C, components having the same function as those in FIGS. 5A, 5B, and 5C are given the same reference numerals and the description thereof has been omitted.

As shown in FIGS. 17A, 17B, and 17C, the lens portion 610 has a movable lens 615 and a lens holder 612. The movable lens 615 is composed of the lens 611 and the movable base holder 621 that have been formed integrally. The movable lens 615 can be produced by shaping glass or resin by injection molding, cutting, or the like. Furthermore, since the movable lens 615 includes the lens 611, it is desirable that the movable lens 615 is formed of a material having a high refractive index and low dispersibility.

The configuration of the movable lens 615 will be described specifically. The movable lens 615 has a substantially columnar shape, and the lens 611 is formed in the vicinity of the center of the movable lens 615. As in the movable base holder of Embodiment 1, three annular protrusions 621a, 621b, and 621c are formed on an outer periphery of the movable lens 615. A groove-like bobbin portion 621d is formed by the protrusions 621a and 621b and the outer peripheral portion of the movable lens 611. A groove-like bobbin portion 621e is formed by the protrusions 621b and 621c and the outer peripheral portion of the movable lens 611. The upper coil 622a is wound around the bobbin portion 621d, and the lower coil 622b is wound around the bobbin portion 621e. Since the upper coil 622a and the lower coil 622b are wound around the groove-like bobbin portions 621d and 621e, it is possible to wind the coils easily without the fear that the coils might be displaced. It is to be noted here that, even in the case where the protrusions 621a and 623c are not formed, a jig or the like that can substitute for the protrusions may be used only when winding the upper coil 622a and the lower coil 622b. In this case, the upper coil 622a and the lower coil 622b may be formed by winding a self-welding wire and the jig may be removed after the welding. Since the bobbin portion 621d and the bobbin portion 621e are formed in the movable lens 615 as described above, the necessity of providing a component such as a holder can be eliminated, thus allowing the camera module to be made smaller. Furthermore, the number of required components is reduced, which contributes to the cost reduction of the camera module.

The movable lens 615 has an upper electrode 626a and a lower electrode 626b. The upper electrode 626a is formed in the upper part of the movable lens 615 by metal deposition or the like. The upper electrode 626a is connected electrically to one end of each of the upper coil 622a and the lower coil 622b. The lower electrode 626b is formed in the lower part of the movable lens 615 by metal deposition or the like. The lower electrode 626b is connected electrically to the other end of each of the upper coil 622a and the lower coil 622b. Thus, by attaching the upper spring 41a and the lower spring 41b to the movable lens 615, the upper spring 41a and the lower spring 41b are connected electrically to the upper coil 622a and the lower coil 622b via the upper electrode 626a and the lower electrode 626b. This eliminates the necessity of soldering when connecting these components. Thus, a space required for soldering is no longer necessary, so that the camera module can be made smaller.

The lens holder 612 is provided on the movable lens 615. The lens holder 612 is obtained by forming resin or the like into a substantially columnar shape by injection molding or the like. A tapered hole is formed on an inner surface of the lens holder 621. In the lens holder 612, an opening 613a is provided on a side farther from the imaging element 4 (see FIG. 1). Incident light is converged by the opening 613a, enters the lens 611, and passes through the lens 611 to be emitted.

A fixed base 30 and a coupling portion 40 are the same as those in Embodiment 1 and the description thereof has been omitted.

The inner annular portion of the upper spring 41a has cut-away portions in which the protrusions 623a, 623b, 623c, and 623d provided in the movable lens 615 can fit. The positioning of the upper spring 41a is achieved by fitting the protrusions 623a, 623b, 623c, and 623d in these cut-away portions, after which the upper spring 41a is fixed to the movable lens 615 with an adhesive or the like.

The inner annular portion of the lower spring 41b has cut-away portions in which the protrusions 624a, 624b, 624c, and 624d provided in the movable lens 615 can fit. The positioning of the lower spring 41b is achieved by fitting the protrusions 624a, 624b, 624c, and 624d in these cut-away portions, after which the lower spring 41b is fixed to the movable lens 615 with an adhesive or the like. Since the positioning can be achieved easily as described above, it is not necessary to perform a position adjustment step, thus allowing the cost reduction of the camera module. It is to be noted that protrusions may be provided in the upper spring 41a and the lower spring 41b, and cut-away portions in which these protrusions can fit may be formed in the movable lens 615.

Figure 18:
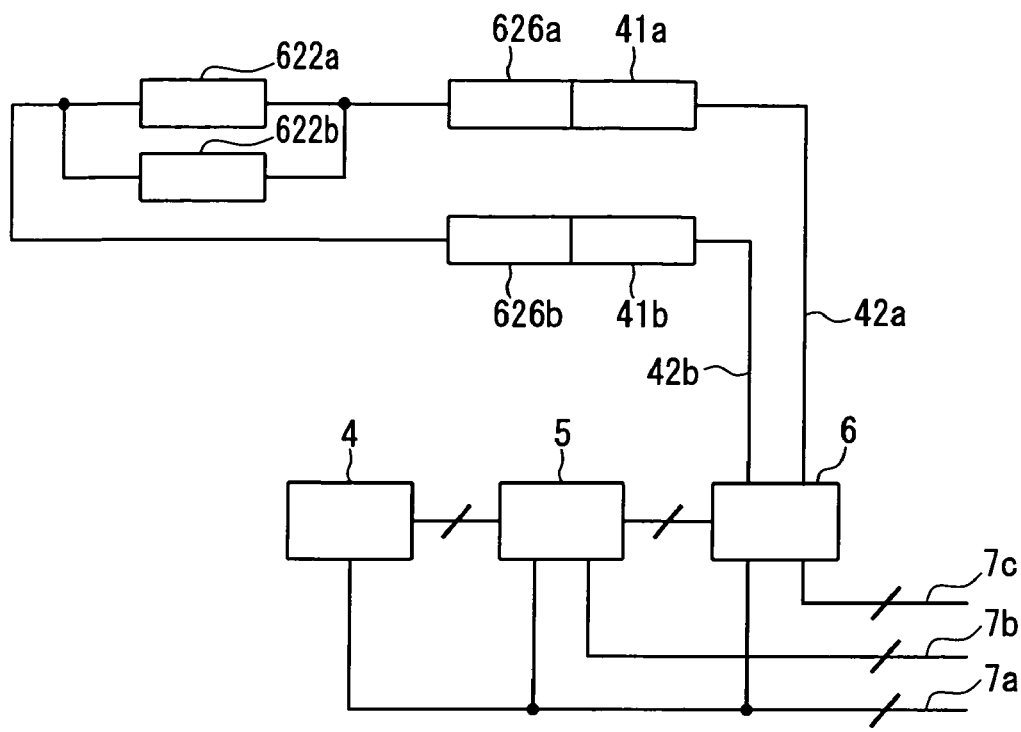
FIG. 18 is a circuit diagram of the camera module according to Embodiment 7 of the present invention.

FIG. 18 is a circuit diagram of the camera module according to Embodiment 7 of the present invention. In the following description, reference also will be made to FIG. 1. The inner peripheral side of the upper spring 41a provided on the upper surface of the movable lens 615 is connected to the upper electrode 626a, and the upper electrode 626a is connected electrically to one end of the winding of each of the upper coil 622a and the lower coil 622b. The inner peripheral side of the lower spring 41b that is provided on the lower surface of the movable lens 615 is connected to the lower electrode 626b, and the lower electrode 626b is connected electrically to the other end of the winding of each of the upper coil 622a and the lower coil 622b. Thus, the upper wire 42a connecting the upper spring 41a and the driving element 6 is connected electrically to one end of each of the upper coil 622a and the lower coil 622b via the upper spring 41a and the upper electrode 626a. On the other hand, the lower wire 42b connecting the lower spring 41b and the driving element 6 is connected electrically to the other end of each of the upper coil 622a and the lower coil 622b of the coil portion 622 via the lower spring 41b and the lower electrode 626b.

Although the upper coil 622a and the lower coil 622b are connected in parallel in FIG. 18, they may be connected in series. When they are connected in parallel, the electric resistance becomes smaller, thus reducing the resistance loss. On the other hand, when they are connected in series, even if an electric resistance varies between the coils, variations in Lorentz force caused in the coils can be reduced because the same current flows through the coils.

Next, a method of controlling the relative distance between the lens 611 and the imaging element 4 for focusing will be described. A voltage is applied so that the potential of the upper wire 42a is higher than that of the lower wire 42b, thereby causing a current to flow through the upper coil 622a and the lower coil 622b. The upper coil 622a and the lower coil 622b are wired so that the current flows through the upper coil 622a counterclockwise and through the lower coil 622b clockwise when viewed from the top (the light entrance side) of the lens module 1. Due to the interaction (Lorentz force) between the magnetic fluxes caused by the respective permanent magnets 31a, 31b, 31c, and 31d and the currents flowing through the upper coil 622a and the lower coil 622b, an upward force is applied to the upper coil 622a and the lower coil 622b. The movable lens 615 moves upward until it reaches a position where this upward force balances the force (Hooke's force) caused by the deformation of the upper spring 41a and the lower spring 41b of the coupling portion 40. Thus, the relative distance between the lens 611 and the imaging element 4 increases.

The movement amount of the lens 611 is proportional to the Lorentz force, the Lorentz force is proportional to the current flowing through the upper coil 622a and the lower coil 622b, and the current is proportional to the voltage between the upper wire 42a and the lower wire 42b. Therefore, the controlling element 5 can control the relative distance between the lens 611 and the imaging element 4 by controlling the voltage between the upper wire 42a and the lower wire 42b using the driving element 6.

With the above-described configuration and operations, the camera module of Embodiment 7 produces the same effect as that of the camera module of Embodiment 1.

It is to be noted that, in the camera modules according to Embodiments 2 to 6, the lens portion and the movable base may be formed integrally as in the camera module according to Embodiment 7.

Embodiment 8

Figure 19:
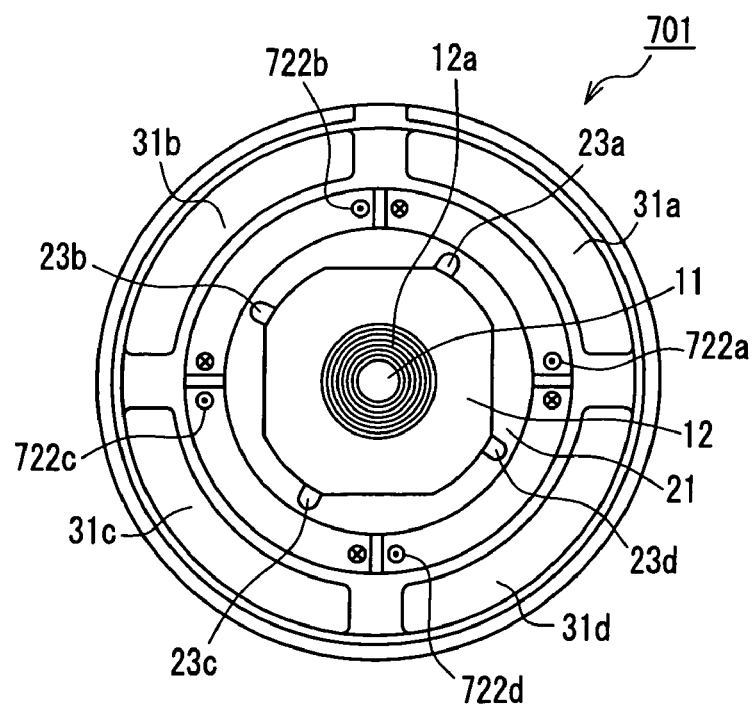
FIG. 19 is a plan view for illustrating an arrangement of a coil and a permanent magnet in a lens module according to Embodiment 8 of the present invention.

A camera module according to Embodiment 8 of the present invention will be described with reference to the drawings. The camera module of Embodiment 8 has substantially the same configuration as the camera module of Embodiment 1, except for the shape of the coils. More specifically, while the camera module of Embodiment 1 has two coils arranged in the optical axis direction of the lens, the camera module of Embodiment 8 has four coils arranged so as to surround the optical axis of the lens. Except for this, the camera module of Embodiment 8 has substantially the same configuration as the camera module of Embodiment 1. That is, the camera module of Embodiment 8 can be obtained by modifying the camera module 100 shown in FIG. 1 so as to replace the lens module 1 with a lens module 701 of Embodiment 8. Thus, except for the lens module 701, the configuration and the operations of the camera module of Embodiment 8 are the same as those of the camera module of Embodiment 1 and the description thereof has been omitted. FIG. 19 is a plan view for illustrating an arrangement of a coil and a permanent magnet in a lens module according to Embodiment 8 of the present invention. More specifically, FIG. 19 is a plan view showing the lens module of Embodiment 8 in the state where an upper spring and an upper insulating sheet are removed therefrom so as to show the configuration and the arrangement of coils 722a, 722b, 722c, and 722d more clearly. In FIG. 19, components having the same function as those in FIG. 5A are given the same reference numerals and the description thereof has been omitted. In the following description, reference also will be made to FIGS. 5A, 5B, and 5C.

The lens module according to Embodiment 1 has an upper coil and a lower coil arranged in the optical axis direction. In contrast, the lens module 701 of Embodiment 8 has four coils 722a, 722b, 722c, and 722d arranges at intervals of 90° about the optical axis. In the lens module of Embodiment 1, a protrusion is provided on the outer periphery of the movable base holder so that the upper coil and the lower coil are wound around the movable base holder more easily. However, such a protrusion is not provided in the lens module 701.

On the outer periphery of the movable base holder 21, the four coils 722a, 722b, 722c, and 722d are arranged at intervals of 90° about the optical axis of the lens 11. Each of the coils 722a, 722b, 722c, and 722d is a substantially rectangular-shaped coil composed of a plurality of layers formed of a self-welding wire or the like, and are arranged so that magnetic flux is generated in the radial direction of the lens 11. Furthermore, the coils 722a, 722b, 722c and 722d are arranged so as to oppose the permanent magnets 31a, 31b, 31c, and 31d, respectively.

Figure 20:
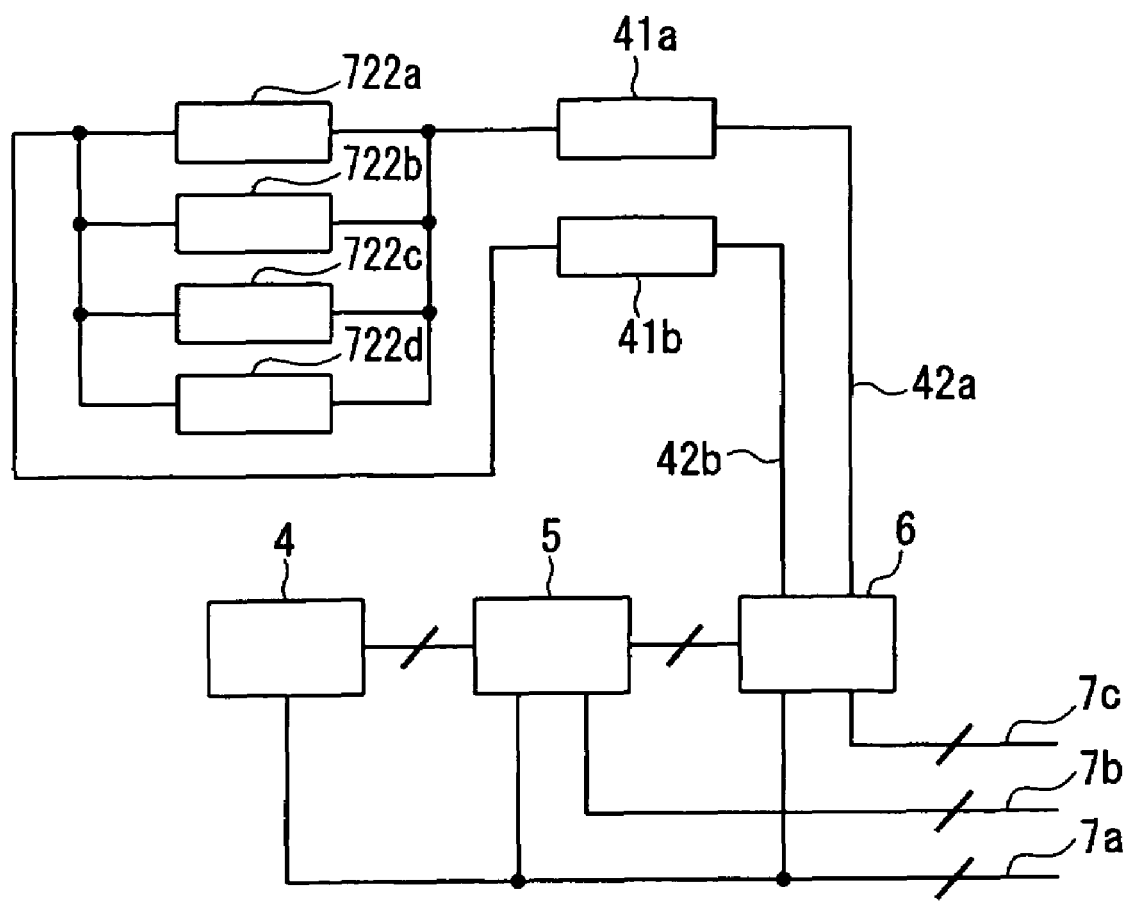
FIG. 20 is circuit diagram of the camera module according to Embodiment 8 of the present invention.
Figure 21:
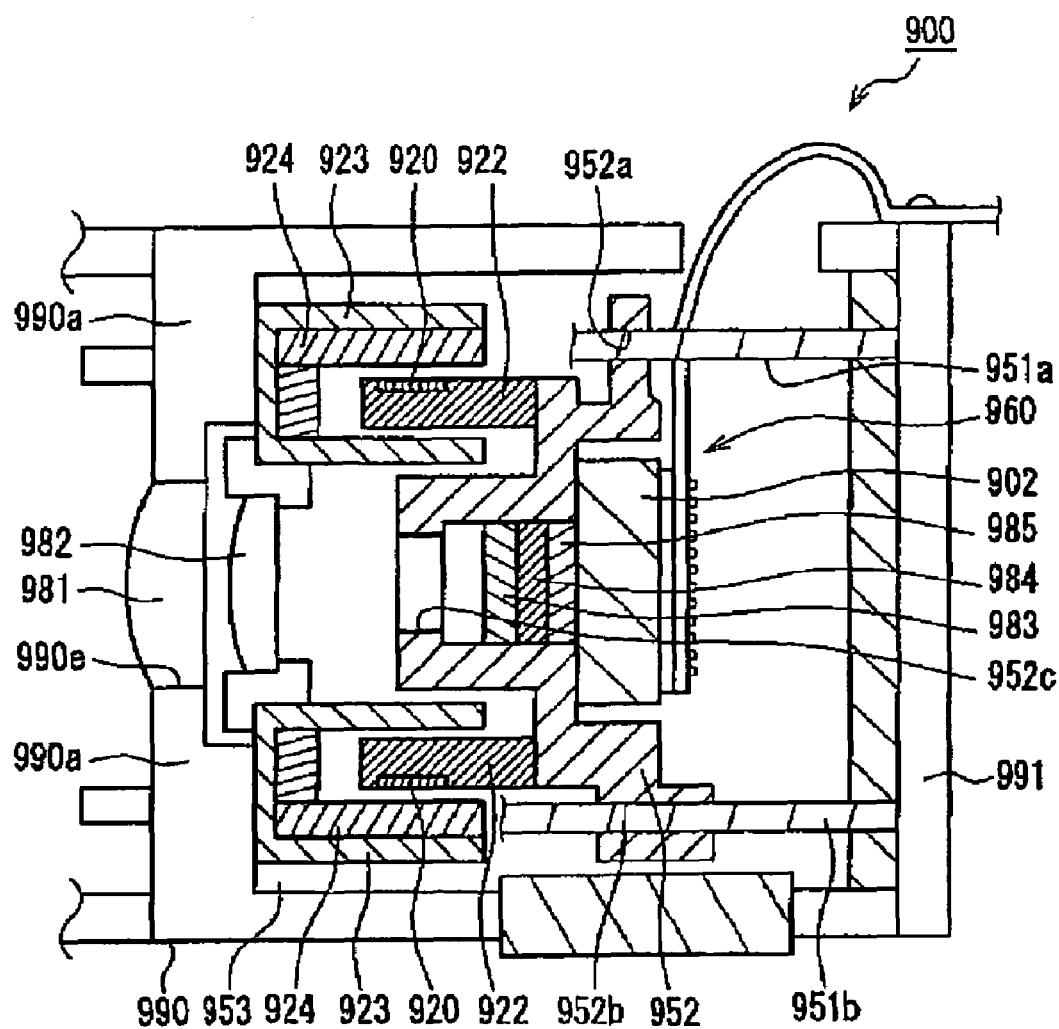
FIG. 21 is a sectional view showing a configuration of a conventional camera module.

FIG. 20 is a circuit diagram of the lens module according to Embodiment 8 of the present invention. The inner peripheral side of the upper spring 41a is connected electrically to one end of each of the winding of the coils 722a, 722b, 722c, and 722d. The inner peripheral side of the lower spring 41b is connected electrically to the other end of each of the winding of the coils 722a, 722b, 722c, and 722d. That is, the upper wire 42a is connected electrically to one end of each of the coils 722a, 722b, 722c, and 722d via the upper spring 41a, and the lower wire 42b is connected electrically to the other end of each of the coils 722a, 722b, 722c, and 722d via the lower spring 41b. Although the coils 722a, 722b, 722c and 722d are connected in parallel in FIG. 20, they may be connected in series. When they are connected in parallel, the electric resistance becomes smaller, thus reducing the resistance loss. On the other hand, when they are connected in series, even if an electric resistance varies between the coils, variations in Lorentz force caused in the coils can be reduced because the same current flows through the coils.

Next, the position control of the lens 11 and the imaging element 4 for the focus control of this lens module 701 will be described. A voltage is applied so that the potential of the upper wire 42a is higher than that of the lower wire 42b, thereby causing a current to flow through the coils 722a, 722b, 722c, and 722d. The coils 722a, 722b, 722c, and 722d are wired so that the current flows through the coils 722a, 722b, 722c, and 722d clockwise when the coils 722a, 722b, 722c, and 722d are viewed from the side of the permanent magnets 31a, 31b, 31c, and 31d, respectively.

The upper part of each of the permanent magnets 31a, 31b, 31c, and 31d is magnetized so that an inner side thereof becomes an N pole and an outer side thereof becomes an S pole. The lower part of each of the permanent magnets 31a, 31b, 31c, and 31d is magnetized so that an inner side thereof becomes an S pole and an outer side thereof becomes an N pole. With such a configuration, due to the interaction (Lorentz force) between the magnetic fluxes caused by the respective permanent magnets 31a, 31b, 31c, and 31d and the current flowing through the coils 722a, 722b, 722c, and 722d, an upward force is applied to the coils 722a, 722b, 722c, and 722d. The lens portion 10 and the movable base 20 integrally move upward until they reach a position where this upward force balances the force (Hooke's force) caused by the deformation of the upper spring 41a and the lower spring 41b of the coupling portion 40. Thus, the relative distance between the lens 11 and the imaging element 4 increases.

It is to be noted here that the position control of the lens 11 and the imaging element 4 still is possible when the coils 722b and 722d are wound in the inverse direction and the permanent magnets 31b and 31d are magnetized in the inverse direction.

The movement amount of the lens portion 10 and the movable base 20 is proportional to the Lorentz force, the Lorentz force is proportional to the current flowing through the coils 722a, 722b, 722c, and 722d, and the current is proportional to the voltage between the upper wire 42a and the lower wire 42b. Therefore, the controlling element 5 (see FIG. 1) can control the relative distance between the lens 11 and the imaging element 4 by controlling the voltage between the upper wire 42a and the lower wire 42b using the driving element 6 (see FIG. 1).

With the above-described configuration and operations, the camera module of Embodiment 8 produces the same effect as that of the camera module of Embodiment 1.

Similarly to the camera module of Embodiment 1, the camera modules of Embodiments 3 to 5 and Embodiment 7 also are configured so as to control the distance between the lens and the imaging element using two coils arranged along the optical axis. These camera modules also may be configured so as to control the distance between the lens and the imaging element using four coils arranged around the optical axis as in the camera module of Embodiment 8.

Although specific embodiments of the present invention have been described above, it should be noted that materials, configurations, etc. specifically given in Embodiments 1 to 8 merely are illustrative and the present invention is by no means limited thereto. For example, the upper spring and the lower spring may have a shape other than those given above. For example, the number of arms may be three or five.

Furthermore, configurations of respective portions in the camera modules of Embodiments 1 to 8 may be combined as appropriate. For example, in the camera module of Embodiment 2, the lens holder used in the camera module of Embodiment 1 may be used.

INDUSTRIAL APPLICABILITY

A camera module of the present invention is a small and thin autofocus camera module with low power consumption. Therefore, it is useful in cellular phones with a camera function, digital still cameras, surveillance cameras, and the like.

The invention claimed is:

1. A camera module comprising:
a lens portion comprising at least one lens;
an imaging element having a light-receiving surface that is substantially perpendicular to an optical axis direction of the lens;
a fixed portion provided on an outer peripheral side of the lens portion;
a first elastic body that is provided on a side opposite to the imaging element side with respect to the lens and couples the lens portion and the fixed portion; and
a second elastic body that is provided on the imaging element side with respect to the lens and couples the lens portion and the fixed portion,
wherein the first elastic body and the second elastic body have the same shape,
the first elastic body and the second elastic body are arranged so as to oppose each other while sharing a common central axis, and
the second elastic body is oriented with respect to said common central axis differently from an orientation of the first elastic body with respect to said common central axis.

2. The camera module according to claim 1, wherein the second elastic body is oriented such that it would coincide with the first elastic body if the first elastic body were moved substantially parallel to an optical axis direction of the lens and then were inverted symmetrically with respect to an axis perpendicular to the optical axis of the lens.

3. The camera module according to claim 1, wherein the second elastic body is oriented such that it would coincide with the first elastic body if the first elastic body were moved substantially parallel to an optical axis direction of the lens and then were rotated about the optical axis of the lens.

4. The camera module according to claim 3, wherein each of the first elastic body and the second elastic body includes an outer annular portion connected to the fixed portion, an inner annular portion connected to the lens portion, and N (N is an integer of 2 or more) arms connecting the outer annular portion and the inner annular portion, and
the second elastic body is oriented such that it would coincide with the first elastic body if the first elastic body were moved substantially parallel to the optical axis direction of the lens and then were rotated $(180/N)°$ substantially about the optical axis of the lens.

5. The camera module according to claim 1, wherein the lens portion comprises a plurality of lenses,
each of the first elastic body and the second elastic body includes an outer annular portion connected to the fixed portion, an inner annular portion provided on an inner side of the outer annular portion, and at least one arm connecting the outer annular portion and the inner annular portion, and
the inner annular portion is supported at a substantially central position of the lens portion.

6. The camera module according to claim 1, wherein the lens portion comprises a plurality of lenses,
each of the first elastic body and the second elastic body includes an outer annular portion connected to the fixed portion, an inner annular portion connected to the lens portion, and arms connecting the outer annular portion and the inner annular portion, and
the number of the arms provided in each of the first elastic body and the second elastic body is the same as the number of the lenses.

7. The camera module according to claim 1, wherein a coil is provided on the outer peripheral side of the lens portion, the fixed portion comprises a permanent magnet portion for generating a magnetic field in the coil and a yoke that is formed of a ferromagnetic material and is arranged on an outer peripheral side of the permanent magnet portion, and the coil, the permanent magnet portion, and the yoke constitute an actuator for changing a relative position of the lens with respect to the imaging element.

8. The camera module according to claim 7, wherein the first elastic body and the second elastic body are electrically conductive, and each of the first elastic body and the second elastic body is connected to the permanent magnet portion via an insulating sheet that is electrically insulating.

9. The camera module according to claim 7, further comprising:

a driving element for supplying electric power to the actuator; and a controlling element for performing an arithmetic processing with respect to an electric signal from the imaging element, wherein a distance between the imaging element and the driving element is longer than a distance between the imaging element and the controlling element.

10. The camera module according to claim 7, wherein the coil is formed by winding a wire around an outer periphery of the lens.

11. The camera module according to claim 10, wherein the lens has an electrode connected electrically to the coil, and each of the first elastic body and the second elastic body is electrically conductive and is in contact with the electrode.

12. The camera module according to claim 7, wherein the permanent magnet portion and the coil are arranged inside the yoke and between the first elastic body and the second elastic body.

* * * * *